United States Patent
Galitsky

(10) Patent No.: US 12,182,518 B2
(45) Date of Patent: Dec. 31, 2024

(54) RELYING ON DISCOURSE ANALYSIS TO ANSWER COMPLEX QUESTIONS BY NEURAL MACHINE READING COMPREHENSION

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 388 days.

(21) Appl. No.: 17/505,462

(22) Filed: Oct. 19, 2021

(65) Prior Publication Data

US 2022/0138432 A1    May 5, 2022

Related U.S. Application Data

(60) Provisional application No. 63/107,189, filed on Oct. 29, 2020.

(51) Int. Cl.
*G06F 40/35* (2020.01)
*G06F 40/211* (2020.01)
(Continued)

(52) U.S. Cl.
CPC ............ *G06F 40/35* (2020.01); *G06F 40/211* (2020.01); *G06F 40/284* (2020.01); *G06N 5/04* (2013.01)

(58) Field of Classification Search
CPC ...... G06F 40/35; G06F 40/284; G06F 40/211; G06N 5/04
See application file for complete search history.

(56) References Cited

U.S. PATENT DOCUMENTS 8,935,277 B2 * 1/2015 Kuchmann-Beauger .................... G06F 16/9024
707/769
9,171,037 B2   10/2015 Galitsky et al.
(Continued)

OTHER PUBLICATIONS

Breja et al., "A Survey on Why-Type Question Answering Systems", Nov. 12, 2019 (Year: 2019).*
(Continued)

*Primary Examiner* — Hai Phan
*Assistant Examiner* — Alvin Iskender
(74) *Attorney, Agent, or Firm* — Kilpatrick Townsend & Stockton LLP

(57) ABSTRACT

An autonomous agent receives a user query comprising the complex question. The agent can obtain, from a corpus of unstructured texts, an answer candidate text corresponding to the user query and comprising text from which the answer is subsequently identified. The agent may generate first linguistic data corresponding to the user query and second linguistic data corresponding to the answer candidate text. Each instance of linguistic data may comprise a combination of respective syntactic data, semantic data, and discourse data generated from the user query and/or answer candidate text. Both instances of linguistic data may be provided to a machine-learning model that has been previously trained to output an answer identified from an instance of unstructured text (e.g., the answer candidate text). The model may output the answer identified from the answer candidate text, which in turn may be provided in response to the user query.

20 Claims, 11 Drawing Sheets

(51) Int. Cl.
  *G06F 40/284* (2020.01)
  *G06N 5/04* (2023.01)

(56) References Cited

U.S. PATENT DOCUMENTS

| | | | | |
|---|---|---|---|---|
| 10,769,374 | B1* | 9/2020 | Chen | G06F 17/16 |
| 10,839,154 | B2 | 11/2020 | Galitsky | |
| 2013/0007033 | A1* | 1/2013 | Brown | G06N 5/02 |
| | | | | 707/768 |
| 2016/0125751 | A1* | 5/2016 | Barker | G16H 40/20 |
| | | | | 434/322 |
| 2018/0329880 | A1 | 11/2018 | Galitsky | |
| 2018/0357220 | A1 | 12/2018 | Galitsky | |
| 2018/0357221 | A1 | 12/2018 | Galitsky | |
| 2019/0138595 | A1 | 5/2019 | Galitsky | |
| 2019/0236085 | A1 | 8/2019 | Galitsky | |
| 2019/0347297 | A1 | 11/2019 | Galitsky | |
| 2020/0004813 | A1 | 1/2020 | Galitsky | |
| 2022/0245360 | A1 | 8/2022 | Galitsky | |

OTHER PUBLICATIONS

Breja et al., "A Survey on Why-Type Question Answering Systems", 2019 (Year: 2019).*
Gajbhiye et al. "CAM: A Combined Attention Model for Natural Language Inference", 2018 (Year: 2018).*
Better Language Models and their Implications, OpenAI, Available Online at: https://openai.com/blog/better-language-models/, Feb. 14, 2019, 11 pages.
Bernardy et al., What Kind of Natural Language Inference are NLP Systems Learning: Is this Enough? Proceedings of the 11th International Conference on Agents and Artificial Intelligence (ICAART), Feb. 2019, pp. 919-931.
Bordes et al., Learning End-To-End Goal-Oriented Dialog, Available online at: https://arxiv.org/abs/1605.07683, Mar. 30, 2017, 15 pages.
Branavan et al., Reading between the Lines: Learning to Map High-Level Instructions to Commands, Proceedings of the 48th Annual Meeting of the Association for Computational Linguistics, Jul. 2010, pp. 1268-1277.
Chandu et al., Reading Between the Lines: Exploring Infilling in Visual Narratives, Proceedings of the Conference on Empirical Methods in Natural Language Processing (EMNLP), Nov. 2020, pp. 1220-1229.
Clark et al., Think you have Solved Question Answering? Try ARC, the AI2 Reasoning Challenge, arXiv:1803.05457, Available Online at: https://arxiv.org/pdf/1803.05457.pdf, 2018, 10 pages.
Cooper et al., Using the Framework, Framework for Computational Semantics LRE 62-051, Jan. 1996, 170 pages.
Demszky et al., Transforming Question Answering Datasets into Natural Language Inference Datasets, arXiv:1809.02922, Available Online at: https://arxiv.org/pdf/1809.02922.pdf, 2018, 11 pages.
Elmessiry et al., Triaging Patient Complaints: Monte Carlo Cross-Validation of Six Machine Learning Classifiers, JMIR Medical Informatics, vol. 5, No. 3, Jul. 31, 2017, 10 pages.
Falke et al., Ranking Generated Summaries by Correctness: an Interesting but Challenging Application for Natural Language Inference, in Proceedings of the 57th Annual Meeting of the Association for Computational Linguistics, Jul. 2019, pp. 2214-2220.
Fan et al., Strategies for Structuring Story Generation, Proceedings of the 57th Annual Meeting of the Association for Computational Linguistics, Jul. 28-Aug. 2, 2019, pp. 2650-2660.
Galitsky et al., Chatbot with a Discourse Structure-Driven Dialogue Management, Proceedings of the Software Demonstrations of the 15th Conference of the European Chapter of the Association for Computational Linguistics, Apr. 3-7, 2017, pp. 87-90.
Galitsky, Discourse Level Dialogue Management, Developing Enterprise Chatbots, Apr. 5, 2019, pp. 365-426.
Galitsky et al., Matching Sets of Parse Trees for Answering Multi-Sentence Questions, Proceedings of Recent Advances in Natural Language Processing, Sep. 7-13, 2013, pp. 285-293.
Galitsky et al., On a Chatbot Conducting Dialogue-in-Dialogue, Proceedings of the 20th Annual SIGdial Meeting on Discourse and Dialogue, Sep. 11-13, 2019, pp. 118-121.
Galitsky et al., On a Chatbot Conducting Virtual Dialogues, CIKM '19: Proceedings of the 28th ACM International Conference on Information and Knowledge Management, vol. 4, Nov. 3, 2019, pp. 2925-2928.
Galitsky, Reasoning and Simulation of Mental Attitudes of a Customer, Artificial Intelligence for Customer Relationship Management: Solving Customer Problems, 2021, pp. 371-428.
Galitsky, Truth, Lie and Hypocrisy, Artificial Intelligence for Customer Relationship Management: Solving Customer Problems, 2021, pp. 223-287.
Geiger et al., Stress-testing Neural Models of Natural Language Inference with Multiply-quantified Sentences, arXiv:1810.13033, Available Online at: https://arxiv.org/pdf/1810.13033.pdf, 2018, 6 pages.
Glockner et al., Breaking NLI Systems with Sentences that Require Simple Lexical Inferences, arXiv:1805.02266, Available Online at: https://arxiv.org/pdf/1805.02266.pdf, 2018, pp. 650-655.
Hwang et al., COMET-ATOMIC 2020: on Symbolic and Neural Commonsense Knowledge Graphs, arXiv:2010.05953, Available Online at: https://arxiv.org/pdf/2010.05953.pdf, 2021, 19 pages.
Ilvovsky et al., Controlling Chat Bot Multi-Document Navigation with the Extended Discourse Trees, 4th International Conference on Computational Linguistics in Bulgaria (CLIB), Jun. 2020, pp. 63-71.
Kapanipathi et al., Infusing Knowledge into the Textual Entailment Task using Graph Convolutional Networks, Proceedings of the AAAI Conference on Artificial Intelligence, vol. No. 3405, Apr. 2020, pp. 8074-8081.
Kaplan, Read Between the Lines: Understanding Clinical Studies, Winter, vol. 18, No. 1, Feb. 16, 2019, 13 pages.
Lai et al., Learning to Predict Denotational Probabilities for Modeling Entailment, Proceedings of the 15th Conference of the European Chapter of the Association for Computational Linguistics: vol. 1, Long Papers, Apr. 2017, pp. 721-730.
Lamprell et al., Reading Between the Lines: a Five-Point Narrative Approach to Online Accounts of Illness, Journal of Medical Humanities, vol. 40, No. 4, Dec. 2019, pp. 569-590.
Lenat, Cyc: a Large-Scale Investment in Knowledge Infrastructure, Communications of the ACM, vol. 38, No. 11, Nov. 1995, pp. 33-38.
Makhalova et al., FCA-Based Approach for Query Refinement in IR-Chatbots, 18th Russian Conference, RCAI, Oct. 10-16, 2020, 13 pages.
Michael, Learning from Partial Observations, International Joint Conference on Artificial Intelligence (IJCAI), 2007, 7 pages.
Mitchell, Reading the Web: a Breakthrough Goal for AI, AI Magazine, 2005, 1 page.
Naik et al., Stress Test Evaluation for Natural Language Inference, in Proceedings of the 27th International Conference on Computational Linguistics, 2018, pp. 2340-2353.
Pearl, On the Interpretation of do(x), UCLA Cognitive Systems Laboratory, Technical Report R-486, Feb. 2019, pp. 1-9.
Radford et al., Language Models are Unsupervised Multitask Learners, Available Online at: https://d4mucfpksywv.cloudfront.net/better-language-models/language_models_are_unsupervised_multitask_learners.pdf, Mar. 2019, 24 pages.
Richardson et al., Probing Natural Language Inference Models through Semantic Fragments, Proceedings of the AAAI Conference on Artificial Intelligence, 2019, pp. 8713-8721.
Saha et al., ConjNLI: Natural Language Inference Over Conjunctive Sentences, arXiv:2010.10418, Available Online at: https://arxiv.org/pdf/2010.10418.pdf, 2020, 14 pages.
Salvatore et al., A Logical-based Corpus for Cross-lingual Evaluation, arXiv:1905.05704, Available Online at: https://arxiv.org/pdf/1905.05704.pdf, May 10, 2019, 9 pages.

(56) References Cited

OTHER PUBLICATIONS

Shalyminov et al., Challenging Neural Dialogue Models with Natural Data: Memory Networks Fail on Incremental Phenomena, arXiv:1709.07840, Available Online at: https://arxiv.org/pdf/1709.07840.pdf, 2017, 9 pages.
Trivedi et al., Repurposing Entailment for Multi-Hop Question Answering Tasks, in Proceedings of the North American Chapter of the Association for Computational Linguistics: Human Language Technologies, 2019, pp. 2948-2958.
Valiant, A Theory of the Learnable, Communications of the ACM, vol. 27, No. 11, Nov. 1984, pp. 1134-1142.
Valiant, Knowledge Infusion, AAAI, Available Online at: https://people.seas.harvard.edu/~valiant/AAAI06.pdf, 2006, pp. 1546-1551.
Vendrov et al., Order-embeddings of Images and Language, in Proceedings of the International Conference of Learning Representations (ICLR), 2016, 12 pages.
Vu et al., Grounded Textual Entailment, arXiv :1806.05645, Available Online at : https://arxiv.org/pdf/1806.05645.pdf, 2018, 15 pages.
Warstadt et al., BLiMP: The Benchmark of Linguistic Minimal Pairs for English, Transactions of the Association for Computational Linguistics, vol. 8, Jul. 1, 2020, pp. 377-392.
Williams et al., A Broad-coverage Challenge Corpus for Sentence Understanding through Inference, in Proceedings of the Conference of the North American Chapter of the Association for Computational Linguistics: Human Language Technologies, vol. 1 (Long Papers), Jun. 1-6, 2018, pp. 1112-1122.
Zhou et al., Evaluating Commonsense in Pre-Trained Language Models, arXiv:1911.11931, Available Online at: https://arxiv.org/pdf/1911.11931.pdf, 2019, 8 pages.
What is the best tool or API to know the text Similarity between Two Documents in NLP? Quora, Available online at: https://www.quora.com/What-is-the-best-tool-or-API-to-know-the-text-similarity-between-two-documents-in-NLPQuora, 2019, 11 Pages.
Sense2vec: Semantic Analysis of the Reddit Hivemind, ExplosionAI, Available online at: https://explosion.ai/demos/sense2vec, 2019, 10 Pages.
0Turku NLP Group, Available Online at: http://bionlp-www.utu.fi/wv_demo/, Accessed from Internet on Nov. 4, 2021, 2 pages.
Vietnamese Police Detain 8 Suspects in Connection with Illegal Immigration Organizing, People.cn, Available Online at: http://en.people.cn/n3/2019/1104/c90000-9629296.html, Nov. 4, 2019, 1 page.
Word to Vec JS Demo, Turbomaze, Available Online at: http://turbomaze.github.io/word2vecjson/, Accessed from Internet on Nov. 4, 2021, 1 page.
Auer et al., DBpedia: a Nucleus for a Web of Open Data, International Semantic Web Conference, Lecture Notes in Computer Science, vol. 4825, Nov. 11, 2007, pp. 1-14.
Bahdanau et al., Neural Machine Translation by Jointly Learning to Align and Translate, International Conference on Learning Representations, May 19, 2016, 15 pages.
Banarescu et al., Abstract Meaning Representation for Sembanking, in Proceedings of the 7th Linguistic Annotation Workshop and Interoperability with Discourse, Aug. 8-9, 2013, pp. 178-186.
Bao et al., Knowledge-based Question Answering as Machine Translation, Association for Computational Linguistics, Jun. 23-25, 2014, pp. 967-976.
Bengio et al., Learning Long-Term Dependencies with Gradient Descent is Difficult, IEEE Transactions on Neural Networks, vol. 5, No. 2, Mar. 1994, pp. 157-166.
Bollacker et al., Freebase: a Collaboratively Created Graph Database for Structuring Human Knowledge, Proceedings of the 2008 ACM SIGMOD international conference on Management of data, Jun. 2008, pp. 1247-1250.
Bordes et al., Question Answering with Subgraph Embeddings, in Proceedings of the 2014 Conference on Empirical Methods in Natural Language Processing EMNLP, Oct. 2014, pp. 615-620.
Budanitsky et al., Evaluating WordNet- Based Measures of Lexical Semantic Relatedness, Computational Linguistics, vol. 32, No. 1, Mar. 2006, pp. 13-47.
Choi et al., QuAC: Question Answering in Context, Empirical Methods in Natural Language Processing., Aug. 28, 2018, pp. 2174-2184.
Damonte et al., An Incremental Parser for Abstract Meaning Representation, Proceedings of Equine Analytical Chemistry Laboratory, Apr. 10, 2017, 12 pages.
Damonte et al., Cross-lingual Abstract Meaning Representation Parsing, Proceedings of NAACL., Feb. 24, 2018, 10 pages.
Devlin et al., BERT: Pre-Training of Deep Bidirectional Transformers for Language Understanding, in Proceedings of the Conference of the North American Chapter of the Association for Computational Linguistics: Human Language Technologies, vol. 1, May 24, 2019, 16 pages.
Dozat et al., Deep Biaffine Attention for Neural Dependency Parsing, Available Online at: https://arxiv.org/pdf/1611.01734.pdf, Mar. 10, 2017, pp. 1-8.
Dwivedi, NLP—Building a Question Answering Model, Towards Data Science, Available Online at: https://towardsdatascience.com/nlp-building-a-question-answering-model-ed0529a68c54, Mar. 29, 2018, 7 pages.
Flanigan et al., A Discriminative Graph-Based Parser for the Abstract Meaning Representation, Proceedings of the 52nd Annual Meeting of the Association for Computational Linguistics, Jun. 2014, pp. 1426-1436.
Frank et al., Insensitivity of the Human Sentence-Processing System to Hierarchical Structure, Psychological Science, vol. 22, No. 6, Available Online at: https://www.jstor.org/stable/pdf/25835458.pdf, Jun. 2011, pp. 829-834.
Galitsky, Assuring Chatbot Relevance at Syntactic Level, Developing Enterprise Chatbots, Apr. 2019, 42 pages.
Galitsky, Building Chatbot Thesaurus, Developing Enterprise Chatbots, Apr. 2019, pp. 221-252.
Galitsky et al., Building Integrated Opinion Delivery Environment, Proceedings of the Twenty-Fourth International Florida Artificial Intelligence Research Society Conference, Jan. 2011, 6 pages.
Galitsky et al., From Generalization of Syntactic Parse Trees to Conceptual Graphs, Proceedings of the 18th international conference on Conceptual structures: from information to intelligence, Jul. 2010, pp. 185-190.
Galitsky, Generalization of Parse Trees for Iterative Taxonomy Learning, Information Sciences: an International Journal, vol. 329, Issue C, Feb. 1, 2016, pp. 125-143.
Galitsky, Improving Relevance in a Content Pipeline via Syntactic Generalization, Engineering Applications of Artificial Intelligence, vol. 58, Feb. 2017, pp. 1-26.
Galitsky et al., Improving Text Retrieval Efficiency with Pattern Structures on Parse Thickets, in: Proceedings of FCAIR, Jan. 1, 2013, pp. 6-21.
Galitsky et al., Inferring the Semantic Properties of Sentences by Mining Syntactic Parse Trees, Data & Knowledge Engineering, vol. 81, Nov. 2012, 44 pages.
Galitsky, Learning Discourse-Level Structures for Question Answering, Developing Enterprise Chatbots, Apr. 5, 2019, pp. 177-219.
Galitsky, Machine Learning of Syntactic Parse Trees for Search and Classification of Text, Engineering Applications of Artificial Intelligence, vol. 26, No. 3, Mar. 2013, pp. 1072-1091.
Galitsky, Matching Parse Thickets for Open Domain Question Answering, Data & Knowledge Engineering, vol. 107, Jan. 2017, pp. 24-50.
Galitsky, Natural Language Question Answering System: Technique of Semantic Headers, Advanced Knowledge International, vol. 2, Apr. 2003, 333 pages.
Galitsky et al., Parse Thicket Representation for Multi-Sentence Search, In: International Conference on Conceptual Structures, vol. 7735, Jan. 2013, pp. 153-172.
Galitsky et al., Using Generalization of Syntactic Parse Trees for Taxonomy Capture on the Web, ICCS 2011, LNAI 6828, Jul. 2011, pp. 104-117.
He et al., Jointly Predicting Predicates and Arguments in Neural Semantic Role Labeling, Proceedings of the 56th Annual Meeting

(56) References Cited

OTHER PUBLICATIONS of the Association for Computational Linguistics, Available Online at: https://aclanthology.org/P18-2058.pdf, Jul. 15-20, 2018, pp. 364-369.

Jia et al., Adversarial Examples for Evaluating Reading Comprehension Systems, Empirical Methods in Natural Language Processing, Jul. 23, 2017, 11 pages.

Kocisky et al., The NarrativeQA Reading Comprehension Challenge, Transactions of the Association for Computational Linguistics, vol. 6, May 2018, pp. 317-328.

Kuchaiev et al., Topological Network Alignment Uncovers Biological Function and Phylogeny, Journal of the Royal Society Interface, vol. 7, Mar. 24, 2010, pp. 1341-1354.

Kwiatkowski et al., Scaling Semantic Parsers With on-the-fly Ontology Matching, Empirical Methods in Natural Language Processing, Oct. 18-21, 2013, pp. 1545-1556.

Lan et al., ALBERT: A Lite BERT for Self-Supervised Learning of Language Representations, in Conference Paper at ICLR 2020, Feb. 9, 2020, pp. 1-17.

Li et al., Annotating the Little Prince with Chinese AMRs, LAW-2016, Berlin, Germany, Aug. 11, 2016, 9 pages.

Liang et al., Extending Implicit Discourse Relation Recognition to the PDTB-3, Available Online at: https://arxiv.org/pdf/2010.06294v1.pdf, Oct. 13, 2020, 13 pages.

Liang, Lambda Dependency-based Compositional Semantics, Technical report, Sep. 19, 2013, 7 pages.

Liu et al., Roberta: a Robustly Optimized Bert Pretraining Approach, arXiv:1907.11692, Available Online at: https://arxiv.org/abs/1907.11692, Jul. 26, 2019, 13 pages.

Marcheggiani et al., Encoding Sentences with Graph Convolutional Networks for Semantic Role Labeling, in Proceedings of the 2017 Conference on Empirical Methods in Natural Language Processing (EMNLP), Jul. 30, 2017, 11 pages.

May et al., SemEval-2017 Task 9: Abstract Meaning Representation Parsing and Generation, Proceedings of the 11th International Workshop on Semantic Evaluation, Aug. 3-4, 2017, pp. 536-545.

Mikolov et al., Distributed Representations of Words and Phrases and Their Compositionality, Advances in Neural Information Processing Systems, vol. 26, Oct. 16, 2013, pp. 1-9.

Milenkovic et al., Uncovering Biological Network Function via Graphlet Degree Signatures, Cancer Informatics, vol. 6, Apr. 14, 2008, pp. 257-273.

Mudrakarta et al., Did the Model Understand the Question?, Available Online at: https://arxiv.org/pdf/1805.05492.pdf, May 14, 2018, 12 pages.

Narasimhan, Nvidia Clocks Worlds Fastest Bert Training Time and Largest Transformer Based Model, Paving Path for Advanced Conversational AI, nVIDIA Developer Blog, Available Online at: https://developer.nvidia.com/blog/training-bert-with-gpus/, Aug. 13, 2019, 5 pages.

Peters et al., Deep Contextualized Word Representations, Proceedings of the 2018 Conference of the North American Chapter of the Association for Computational Linguistics: Human Language Technologies, vol. 1, Jun. 1-6, 2018, pp. 2227-2237.

Rajpurkar et al., Know What You Don't Know: Unanswerable Questions for SQuAD, Proceedings of the 56th Annual Meeting of the Association for Computational Linguistics (vol. 2: Short Papers), Jul. 2018, 6 pages.

Rohde et al., Discourse Coherence: Concurrent Explicit and Implicit Relations, in Proceedings of the 56th Annual Meeting of the ACL, Available Online at: https://aclanthology.org/P18-1210.pdf, Jul. 15-20, 2018, pp. 2257-2267.

Roth et al., Neural Semantic Role Labeling with Dependency Path Embeddings, in Proceedings of the 54th Annual Meeting of the Association for Computational Linguistics (ACL), Available Online at: https://aclanthology.org/P16-1113.pdf, Aug. 7-12, 2016, pp. 1192-1202.

Strubell et al., Linguistically-Informed Self-Attention for Semantic Role Labeling, in EMNLP, Available Online at: https://arxiv.org/pdf/1804.08199.pdf?source=post_page - - - , Nov. 12, 2018, 14 pages.

Suchanek et al., A Core of Semantic Knowledge, in Proceedings of the 16th international conference on World Wide Web, May 8-12, 2007, pp. 697-706.

Vaswani et al., Attention Is All You Need, 31st Conference on Neural Information Processing Systems (NIPS 2017), Available Online at: https://arxiv.org/pdf/1706.03762.pdf, Dec. 6, 2017, 15 pages.

Wang et al., Learning Sentence Representation with Guidance of Human Attention, Proceedings of the Twenty-Sixth International Joint Conference on Artificial Intelligence (IJCAI-17), May 2017, pp. 4137-4143.

Webber et al., The Penn Discourse Treebank 3.0 Annotation Manual, Available Online at: https://catalog.ldc.upenn.edu/docs/LDC2019T05/PDTB3-Annotation-Manual.pdf, Mar. 15, 2019, 81 pages.

Li et al., Chinese Abstract Meaning Representation 2.0, Available online at: https://catalog.ldc.upenn.edu/LDC2021T13, 2019, 2 pages.

Yao et al., Information Extraction over Structured data: Question Answering with Freebase, in Proceedings of the 52nd ACL, Jun. 23-25, 2014, pp. 956-966.

Yih et al., Semantic Parsing via Staged Query Graph Generation: Question Answering with Knowledge Base, Microsoft Research, Proceedings of the 53rd Annual Meeting of the Association for Computational Linguistics and the 7th International Joint Conference on Natural Language Processing, vol. 1, Jul. 26-31, 2015, pp. 1321-1331.

Yu et al., Learning to Skim Text, Available Online at: https://arxiv.org/pdf/1704.06877.pdf, Apr. 29, 2017, 11 pages.

U.S. Appl. No. 17/568,527, Notice of Allowance mailed on Jan. 18, 2024, 11 pages.

* cited by examiner

400

```
:ARG1 (g / give-up-07
    :ARG0 (i / i)
    :ARG1 (c / career
        :mod (m / magnificent)
        :topic (p / person
            :ARG0-of (p2 / paint-02))))
```

FIG. 4

RELYING ON DISCOURSE ANALYSIS TO ANSWER COMPLEX QUESTIONS BY NEURAL MACHINE READING COMPREHENSION

CROSS-REFERENCES TO RELATED APPLICATIONS

This application claims the benefit of U.S. Provisional Application No. 63/107,189 filed Oct. 29, 2020, entitled "Relying on Discourse Analysis to Answer Complex Questions by Neural Machine Reading Comprehension," the contents of which is incorporated herein for all purposes.

TECHNICAL FIELD

This disclosure is generally concerned with linguistics. More specifically, this disclosure relates to using discourse analysis and neural machine reading comprehension generate or validate answers to questions.

BACKGROUND

Computer-implemented applications of linguistics are increasing due to the greatly increased speed of processors and capacity of memory. For example, computer-based analysis of language discourse facilitates numerous applications, such as automated agents that can answer questions received from user devices. But existing techniques are not able to reliably and accurately answer questions. Accordingly, improved autonomous agents are desired.

BRIEF SUMMARY

Techniques are disclosed involving the use of syntactic, semantic, and discourse analysis of text to train an MRC model to generate/validate an answer to a complex question.

In some embodiments, a method for identifying an answer to a complex question from unstructured text is disclosed. The method may comprise receiving a user query comprising the complex question. The method may further comprise obtaining, from a corpus of unstructured texts, an answer candidate text corresponding to the user query and comprising text from which the answer is subsequently identified. The method may further comprise generating first linguistic data corresponding to the user query and second linguistic data corresponding to the unstructured text. In some embodiments, the first linguistic data comprises first syntactic data, first semantic data, and first discourse data generated from the user query. In some embodiments, the second linguistic data comprises second syntactic data, second semantic data, and second discourse data generated from the answer candidate text. The method may further comprise providing the first linguistic data and the second linguistic data to a machine-learning model. In some embodiments, the machine-learning model has been previously trained to provide as output an answer generated from an instance of unstructured text. The machine-learning model may configured to receive input comprising linguistic data associated with a question and the instance of unstructured text. The method may further comprise receiving, from the machine-learning model, the answer identified from the answer candidate text. The method may further comprise providing the answer to the complex question in response to the user query.

In some embodiments, the method may comprise generating a syntax tree from the user query (or the answer candidate text). The syntax tree may comprise a first set of nodes and a first set of edges. The first set of nodes may represent individual words of the user query (or the answer candidate text) and the first set of edges may represent a syntactic relationship between respective pairs of words. The method may further comprise generating an abstract meaning representation of the user query (or the answer candidate text). In some embodiments, the abstract meaning representation comprises a directed acyclic graph comprising a second set of nodes and a second set of edges. The second set of nodes may represent words of the user query (or the answer candidate text) and the second set of edges may represent semantic relationships between pairs of words. The method may further comprise generating a discourse tree from the user query (or the answer candidate text). In some embodiments, the discourse tree comprises a third set of nodes and a third set of edges. The third set of nodes may represent the words of the user query (or the unstructured text) and the third set of edges may represent rhetorical relationships between elementary discourse units.

In some embodiments, the machine-learning model includes a self-attention network trained to generate a word embedding from data provided as input. In some embodiments, the word embedding represents each word of the input and corresponding importance weights for each word. The corresponding importance weights may be generated based on at least one of: a syntactic relationship, a semantic relationship, or a rhetorical relationship between elementary discourse units.

In some embodiments, the method may further comprise identifying, based at least in part on a domain-specific ontology, one or more entities of at least one of the user query or the answer candidate text and, for each of the one or more entities, identifying, from the domain-specific ontology, one or more attributes of each entity.

In some embodiments, the method may further comprise validating the answer based on the one or more entities or one or more attributes identified for the user query or the unstructured text. In some embodiments, validating the answer further comprises i) calculating a syntactic generalization score between a first set of entities identified in the answer and a second set of entities identified in the user query, and ii) determining that the answer is valid based at least in part on identifying the syntactic generalization score exceeds a predefined threshold value.

The exemplary method(s) discussed herein can be implemented on systems and/or devices including one or more processors and/or stored as instructions on a non-transitory computer-readable medium.

BRIEF DESCRIPTION OF THE DRAWINGS

FIG. 4 depicts an example abstract meaning representation of a textual passage, in accordance with at least one embodiment.

DETAILED DESCRIPTION

Figure 1:
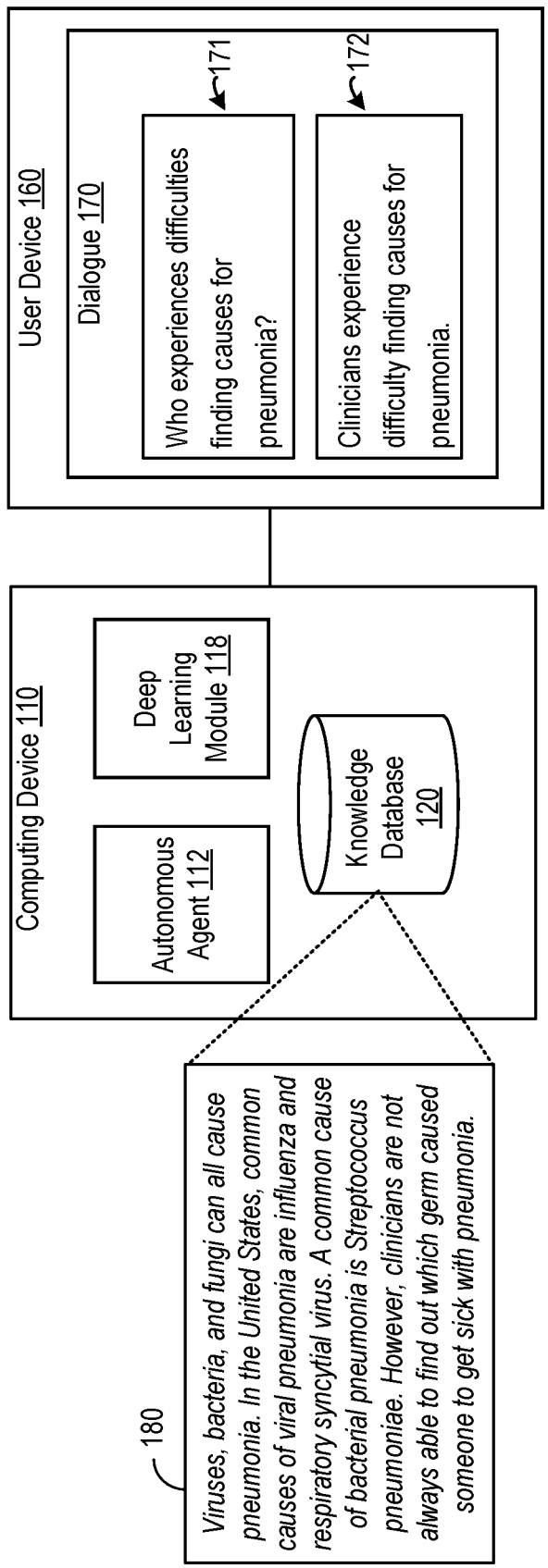
FIG. 1 depicts an example of a computing environment for machine reading comprehension, in accordance with at least one embodiment of the present disclosure.

Aspects of the present disclosure relate to machine reading comprehension (MRC) that employs semantic analysis, syntactic analysis, universal graph alignment, and discourse analysis to generate an answer to a question. In particular, disclosed techniques involve generating and/or verifying answers to questions represented by using syntactic representations (e.g., syntax trees), semantic representations (e.g., Abstract Meaning Representation (AMR), entity-based graph representations of text, and/or discourse representations (discourse trees). These techniques can be used to validate and/or correct answers generated by deep learning systems.

Incorporating knowledge about the target paragraph from such sources as syntactic parse tree (also referred to as a "syntax tree" for brevity), semantic abstract meaning representation (AMR) parsing result, and discourse trees can provide tools for answering attribute-value questions.

For machine reading comprehension (MRC), it is helpful to effectively model the linguistic knowledge from the detail-riddled and lengthy text passage. A human reader reads most words superficially and pays more attention to the essential ones. Although a variety of attentive models have been proposed to imitate human learning, most of them, especially global attention methods equally tackle each word and attend to all words in a sentence without explicit pruning and prior focus, which would result in inaccurate concentration on some dispensable words. Traditional attentive models attend to all words without explicit constraint, which results in inaccurate concentration on some less important words and phrases.

For example, for passage-focused MRC, an input sequence includes multiple sentences. Conventional neural attentive methods and language models regard the input sequence as a whole, with no consideration of the inner linguistic structure inside each sentence. Because of this, there is a process bias caused by noise and lack of associated spans for each concerned word. It is commonly known that the accuracy of MRC models decrease when answering long questions: if the text is particularly lengthy and contains plenty of details, it would be quite difficult for a neural model to process it and build an internal representation. This is because a deep learning approach is affected by noise and does not differentiate between text components.

The techniques disclosed herein relate to providing a self-attention network (SAN) sponsored transformer-based encoder. This SAN is configured to take as input syntactic, semantic, and discourse information. Many of the errors made by a syntax-free neural network MRC models are tied to certain syntactic confusions such as prepositional phrase attachment. Providing a high-quality syntactic, semantic, and discourse parse leads to substantial gains in the ability to generate answers to complex questions. Discourse level features, fed to a neural network MRC model on top of syntactic and semantic features or independently, can help answering complex, long, multi-sentence questions. Providing exact, concise answers frequently relies upon not just syntactic/meaning similarity but an overall structure of thoughts expressed by an author of a text.

Disclosed herein is a neural network and method that selects important words by only considering the related subset of words of syntactic, semantic and discourse-level importance inside each input sentence explicitly. With a guidance of syntactic structure clues, the linguistic features-guided method discussed herein may provide more accurate attentive signals and reduce the impact of the noise brought about by lengthy sentences.

FIG. 1 depicts an example of a computing environment for machine reading comprehension, in accordance with an aspect of the present disclosure. In the example depicted in FIG. 1, computing environment 100 includes one or more of computing device 110 and user device 160. Computing device 110 implements an autonomous agent 112 that engages in a conversation with user device 160 and uses one or more of the techniques disclosed herein to identify answers to questions provided by user device 160. Examples of computing device 110 are an example of the distributed system 900 of FIG. 9 and client computing devices 902, 904, 906, and 908.

User device 160 can be any mobile device such as a mobile phone, smart phone, tablet, laptop, smart watch, and the like. As depicted, user device 160 includes dialogue 170, which includes question 171 and answer 172. In some embodiments, at least a portion of answer 172 is extracted from text 180 (e.g., an example of an answer candidate text). Examples of user device 160 include client computing devices 902, 904, 906, and 908.

Computing device 110 can include one or more of autonomous agent 112, deep learning module 118, and knowledge database 120. An example of the deep learning module 118 is discussed in detail with respect to FIG. 2.

In the example depicted in FIG. 1, computing device 110 interacts with user device 160 in a dialogue session. Dialogue 170, depicted on user device 160, includes utterances (e.g., question 171 and answer 172). Computing device 110 accesses question 171 (e.g., an utterance), analyzes text of the utterance, and determines an answer from an answer candidate text (e.g., text 180). If the answer is determined to be accurate, then autonomous agent 112 provides the answer to user device 160. The conversation can continue.

Examples of suitable text include electronic text source such as text files, Portable Document Format (PDF)® documents, rich text documents, and the like. In some cases, preprocessing may be performed on the input text to remove unwanted characters or formatting fields. Input text can be organized by using one or more structural or organizational approaches such as sections, paragraphs, pages, and the like.

In some embodiments, the deep learning module 118 can utilize syntactic, semantic, and discourse parsing to identify an answer. Syntactic parsing can generate syntactic parse tree for the question and/or a candidate answer. To assist computing device 110 in comprehending the meaning of a sentence, semantic parsing can be applied to map the natural language sentence to some semantic representation. AMR is one such semantic representation and can involve generating a rooted, directed, acyclic graph with labels on the edges (relations) and leaves (concepts). AMR includes a readable bank of English sentences paired with their whole-sentence, logical meanings, resulting in semantic parsers that are as ubiquitous as syntactic ones. The building blocks for the AMR representation are concepts and relations between them. Understanding these concepts and their relations is crucial to computing the meaning of a sentence.

In some embodiments, discourse parsing can be utilized to generate a discourse tree (e.g., a structure that represents rhetorical relations for a sentence or a part of a sentence). Discourse tree may be generated based at least in part on rhetorical structure theory and can include any suitable nodes and edges, wherein each terminal node represents a text span called elementary discourse units (EDUs) and each edge represents a rhetorical relationship between two nodes. Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

In some cases, entities are matched using knowledge database 120. Knowledge database 120 can be a domain-specific ontology (e.g., finance, law, business, science, etc.). The knowledge database 120, among other features, can provide synonym matching. Autonomous agent 112 can build knowledge database 120 or knowledge database 120 from an external source.

In an aspect, autonomous agent 112 can use deep learning module 118 to generate text of an answer to a previously-received question. For instance, autonomous agent 112 provides the question to deep learning module 118. Deep learning module 118 may be configured to select a body of text (e.g., text 180, an answer candidate text) corresponding to the question (e.g., question 171). Autonomous agent 112 obtains the candidate answer from the deep learning module 118.

Deep learning module 118 can be trained by iteratively providing a training question and text comprising context corresponding to the training question to the model and receiving an answer from the model. At each iteration, entities in the answer are compared to entities in a reference answer that corresponds to the training question and one or more parameters of the model of the classification model are adjusted to minimize a loss function. In some cases, text provided to the deep learning module 118 is translated into vectors before being provided to the model. Each vector can represent words and sentences from the text (e.g., text 180). The set of vectors are provided to the model and the answer is obtained. A word2vec model can be utilized.

Figure 2:
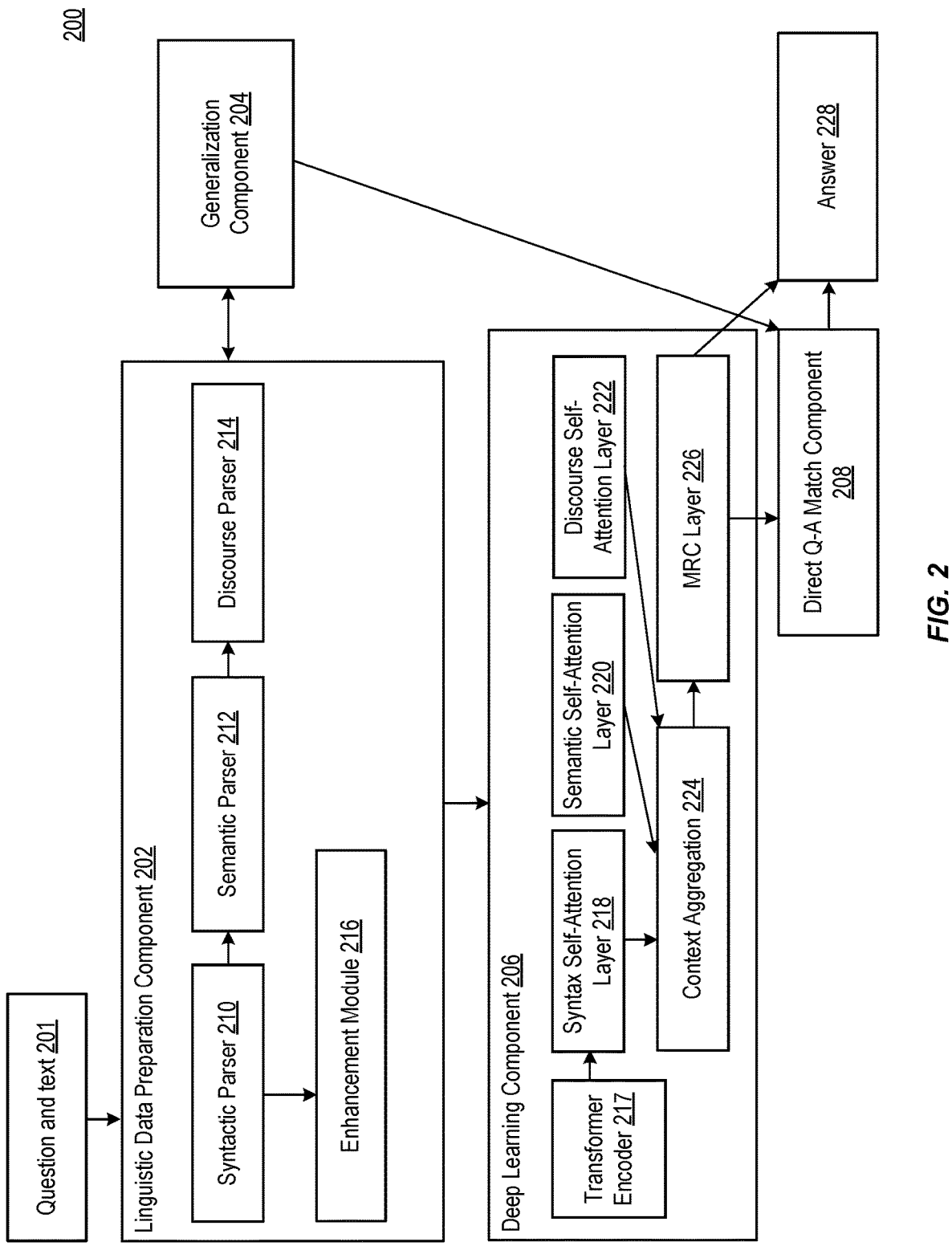
FIG. 2 depicts an architecture for a deep learning module, in accordance with at least one embodiment.

FIG. 2 depicts an architecture for a deep learning module 200 (e.g., the deep learning module 118 of FIG. 1), in accordance with at least one embodiment. The deep learning module 200 may include a linguistic data preparation component 202, generalization component 204, deep learning component 206, and direct question/answer (Q-A) match component 208.

Those skilled in the art have observed that the accuracy of MRC models decreases when answering long questions. Generally, if the text is particularly lengthy and detailed-riddled, it would be quite difficult for deep learning model to understand as it suffers from noise and pays vague attention on the text components, let alone accurately answering questions. Also, for passage involved reading comprehension, an input sequence always consists of multiple sentences. Nearly all of the conventional methods and/or models regard the input sequence as a whole, e.g., a passage, with no consideration of the inner linguistic structure inside each sentence. This results in process bias caused by much noise and lack of associated spans for each concerned word.

A question and text (e.g., the question 171 and text 180, or some portion of the text 180 such as "however, clinicians are not always able to find out which germ caused someone to get sick with pneumonia.") may be provided to the linguistic data preparation component 202. In some embodiments, the linguistic data preparation component 202 may be configured to extract, organize and align linguistic features at various level of knowledge abstraction (e.g., syntactic, semantic, and discourse). By way of example, the linguistic data preparation component 202 may include syntactic parser 210, semantic parser 212, and discourse parser 214.

In some embodiments, the syntactic parser 210 may be configured to selectively pick out important words by only considering the related subset of words of syntactic importance inside each input sentence explicitly. With a guidance of syntactic structure clues, the syntactic parser can provide more accurate attentive signals and reduce the impact of the noise brought about by lengthy sentences. In some embodiments, the syntactic parser 210 may be configured to generate a dependency syntactic parse tree structure. The syntactic parser 210 may produce the related nodes for each word in a sentence, namely syntactic dependency of interest, by regarding each word as a child node and the syntactic dependency of interest consists all its ancestor nodes and itself in the dependency parsing tree. By way of example, the syntactic parser 210 may be configured to generate the syntax trees of FIG. 3.

Figure 3:
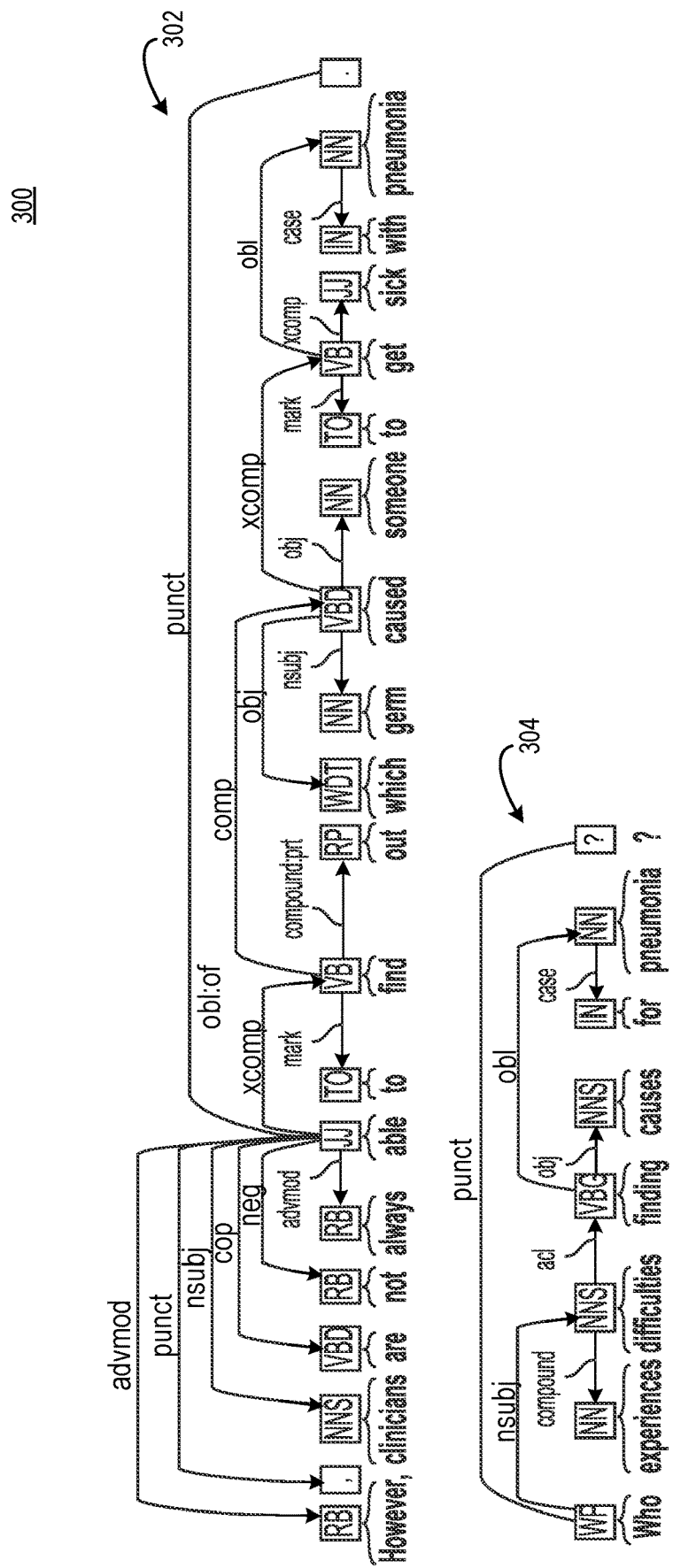
FIG. 3 depicts syntax trees for a question and a textual passage, in accordance with at least one embodiment.

FIG. 3 depicts syntax trees for a question (e.g., question 171 of FIG. 1) and a textual passage (e.g., a portion of the text 180 of FIG. 1), in accordance with at least one embodiment. "Syntax" refers to a set of rules, principles, and processes that govern the structure of sentences, clauses, phrases, etc. in a natural language. For example, syntax would describe how different words such as a subject, a verb, a noun, a noun phrase, and the like are sequenced within a sentence. A syntax tree is a tree representation of different syntactic categories of a sentence. A syntax tree can include any suitable number of nodes and edges, where the nodes represent individual words and the edges represent a syntactic relationship between pairs of words. Thus, a syntax tree describes the syntactical relationship between words in a sentence. Syntax tree 302 is depicts a syntax tree representation of a portion of text 180. Syntax tree 304 depicts a syntax tree representation of the question 171 of FIG. 1.

Returning to FIG. 2, syntactic parser 210 may be configured to perform any suitable operation for performing syntactic generalization of the syntax trees of FIG. 3. For syntactic generalization, the syntax trees 302 and 304 may be generated and a maximum common sub parse tree of the two may be identified. By way of example, the syntactic parser 210 may parse each sentence in text and accumulate phrases by types (e.g., noun, verb, prepositional, adverbial, etc.). Each text may be parsed and the syntax trees of FIG. 3 generated. The syntactic parser 210 may then extend the list of each phrase type by the phrase equivalence transformation results. For each phrase type, the syntactic parser 210 may identify phrase pairs and align them. The syntactic parser 210 may apply a generalization for individual words. In some embodiments, individual words may be provided to a word2vec model.

A word2vec model refers to an algorithm that uses a neural network model to learn word associations from a large corpus of text. Once trained, such a model can detect synonymous words or suggest additional words for a partial sentence. A word2vec algorithm represents each distinct word with a particular list of numbers called a vector. These vectors are chosen such that a simple mathematical function (e.g., the cosine similarity between two vectors) may indicate a level of semantic similarity between the words represented by those vectors.

To enable the application of word2vec, the phrase extraction, aggregation and alignment steps discussed herein may be performed so that word-to-word comparison is syntactically meaningful. The problem of phrase alignment is connected with natural language inference (NLI) in determining whether a natural-language hypothesis H can reasonably be inferred from a given premise text P. In order to recognize that New CA governor visited LA can be inferred from California government attended a meeting in Los Angeles, one must first recognize the correspondence between CA and California, and between visited and attended <an event>.

Once the words of the syntax trees are converted to vectors (e.g., through passing those words to the word2vec model and receiving the corresponding output), the syntactic parser 210 may form a generalization phrase result list and add generalization for each aligned pair of phrases. In some embodiments, the syntactic parser 210 may remove phrases that it deems (e.g., according to a predefined rule set) to be too general (e.g., those for which there exists a less general generalization result). From these operations, a list of all maximum common sub-phrases can be determined. Thus, the syntactic parser 210 may be configured to identify important words (e.g., words that are related to one another with respect to syntax). By using cues from syntactic structures, the disclosed approach improves upon previous solutions by more accurately selecting important words from sentences, thereby reducing impact from noise caused by analyzing by lengthy sentences.

To machine-learn meaning of words in a numerical space, one needs to express a numerical relation between them such as similarity. To provide a meaningful expression of similarity between two words, numbers are not good enough since poorly interpretable, and we need other words for such expression. Similarity between two words is a number, and generalization is a list of words expressing the common meaning of these words. Unlike a default word2vec, only words of the same part of speech and the same semantic role/tag can be generalized, such as animal with another animal, organization with organization, location with location. This is similar to physics where only values of the same physical units can be added, not a current with weight.

Generalization between two words is an unordered list word that expresses a least general meaning of both of them. One way to obtain generalization via word2vec is to intersect a list of synonyms (for the same part of speech) for these two words. For example, painter^architect={exhibition, idea, student, nature, modernity}. Notice that a generalization result can be further generalized with other words and also with other generalization results. Numerical similarity then can be expressed as the relative common number of elements in this list. If $w_1$ and $w_2$ are word or generalization results with the lists { . . . , $w_{1i}$, . . . } and { . . . , $w_{2j}$, . . . } respectively, then $w_1 \char`\^ w_2 = \cup_{ij} (w_{1i} \char`\^ w_{2j})$.

In some embodiments, phrases are first aligned, and then generalized on a word-by-word basis. Firstly, head nouns can be extracted and generalized with each other. If these head nouns give an empty generalization, so are corresponding phrases. For two phrases 'digital camera with long battery life' and 'long zoom focus digital camera with viewfinder' generalization is just 'digital camera' since there is no commonality between other attributes such as battery, viewfinder or zoom. The head noun here in both phrases is camera. Word2vec representation of these individual attributes should not be taken into account to compute generalization since they are not comparable.

In some embodiments, a normalization of phrases such as A with B⇒BA may be needed to compute generalization of distinct forms of phrases. 'video camcorder with long zoom'=>'long zoom video camcorder'. From this, the following generalization may be obtained: 'video camcorder with long zoom'^'short-focus zoom digital camera'='(camcorder^camera) with zoom'.

To generalize two expressions, their main entities (head nouns in their main noun phrase) may first be generalized and then a sequence of argument-by-argument generalizations may be added. For example, given an expression for entity-based and attribute-based representation AMR($Q$)^AMR(A)=E($Q$)^E(A)$\cup_n$ ARGn($Q$)^ARGn(A). Although similarity(deny, reject)<similarity(deny, accept), it is still high enough to conclude that deny=reject for the purpose of generalization.

Semantic parser 212 may be configured to generate any suitable semantic meaning of text. By way of example, semantic parser 212 can generate a semantic tree. A semantic tree (or graph) includes nodes and edges. The nodes represent entities (e.g., a place, person, or thing). Each edge represents a relationship between two of the entities. Information from a semantic tree can alternatively be represented by text. FIG. 4 depicts an example abstract meaning representation 300 of a textual passage, in accordance with at least one embodiment. As depicted, AMR 300 represents the meaning of the verb phrase "gave up what might have been a magnificent career as a painter."

Returning to FIG. 2, the semantic parser 212 may be configured to perform any suitable operations of converting a natural language utterance such as question 171 and text 180 of FIG. 1 to a logical form (e.g., a machine-understandable representation of the question/text's meaning). By way of example, the semantic parser 212 may be configured to generate an abstract meaning representation (AMR) of input text (e.g., the question 171, the text 180, etc.). AMR is a semantic representation language that models input text as a graph that is a rooted, labeled, directed, acyclic graph (DAG) that comprises the entire text. AMR abstracts away from syntactic representations. That is, sentences that have similar meanings should correspond to the same AMR, even if they are not identically worded. In some embodiments, the semantic parser 212 may employ syntactic analysis which uses a domain-specific ontology and possibly a domain-independent semantic parsing engine.

The notion of word similarity is very useful in larger semantic tasks. Knowing how similar two words are can help in computing how similar the meaning of two phrases or sentences is a useful component of natural language tasks like question answering, recommendation, paraphrasing, and summarization. One way of getting values for word similarity is to ask humans to judge how similar one word is to another. The meaning of two words can be related in ways other than relatedness similarity. One such class of connections is called word relatedness, also traditionally called word association in psychology. Consider the meanings of the words coffee and cup. Coffee is not similar to cup; they share practically no features (coffee is a plant or a beverage, while a cup is a specific object made by human with a particular shape). But coffee and cup are clearly related; they are associated by co-participating in an everyday event (the event of drinking coffee out of a cup). Similarly, the nouns chef and knife are not similar but are related via a usability event: a chef employs a knife.

One common kind of relatedness between words is if they belong to the same semantic field. A semantic field is a set of words which cover a particular semantic domain and bear structured relations with each other. For example, words might be related by being in the semantic field of schools (pupil, teacher, board, lesson), or restaurants (waitress, menu, dish, food).

Word2vec and other similar algorithms do not differentiate between similarity and relatedness. In these approaches, similarity and relatedness are expressed by the same 'physical units' of similarity. In the spirit of word2vec, weight can be summed up with electrical current. Similar words play the same semantic role, and related words play complementary roles, such as an adjective and a noun in a noun phrase, a verb and a noun in a verb phrases above. Structurization enforces that the measure of relatedness is computed separately from the measure of similarity between the entities. Just getting a list of related words (related in a variety of ways) is not very useful in applications, and frequently used carelessly. This results in an application producing meaningless responses. To compare a meaning of two words, they need to play the same semantic role. For example, to be a second argument of the same verb or a first argument of two different verbs in the same verb group, like deny and reject.

Utilizing semantic parser 212 to perform semantic analysis to generate semantic representations of the question and answer can complement word2vec with meaning where knowledge of context is key. Once an AMR representation of each of the question 171 and a candidate answer (e.g., a portion of the text 180 such as the last sentence of text 180) are generated, a maximum common sub-AMR representation can be computed by the semantic parser 212. Different approaches can be used to identify semantic similarity, including aligning respective semantic trees corresponding to the question 171 and the portion of the text 180. For instance, a common subtree includes nodes, each of which represents an entity that is common between the first semantic tree and the second semantic tree and has edges between the nodes that represent a semantic relationship between the entities. The nodes are shared in the first semantic tree and the second semantic tree.

In some embodiments, matching a semantic tree (e.g., an unflattened version of an AMR representation of question 171) for a question to a semantic tree for an answer (e.g., an unflattened version of an AMR representation of the portion of text 180) can be broadly classified into three main steps: (1) locating the topic entity in the question, (2) finding the main relationship between the answer and the topic entity, and (3) expanding the query graph with additional constraints that describe properties the answer needs to have, or relationships between the answer and other entities in the question.

A query graph that can be mapped to a logical form in $\lambda$-calculus and is semantically related to $\lambda$-dependency-based compositional semantics (DCS) is defined. For instance, for an expression 'citizens who live in Boston' regular $\lambda$-calculus gives $\lambda x.\exists e.\text{PlacesLive}(x, e) \wedge \text{Location}(e, \text{Boston})$ and $\lambda$-DCS gives PlacesLive.Location.Boston. Hence, DCS attempts to remove explicit use of variables; it makes it similar in spirit to dependency-based compositional semantics.

Utilizing the techniques described above, the linguistic data generated by the semantic parser 212 may include an indication of the words from the question 171 and text 180 that include a related subset of words of semantic importance.

Figure 5:
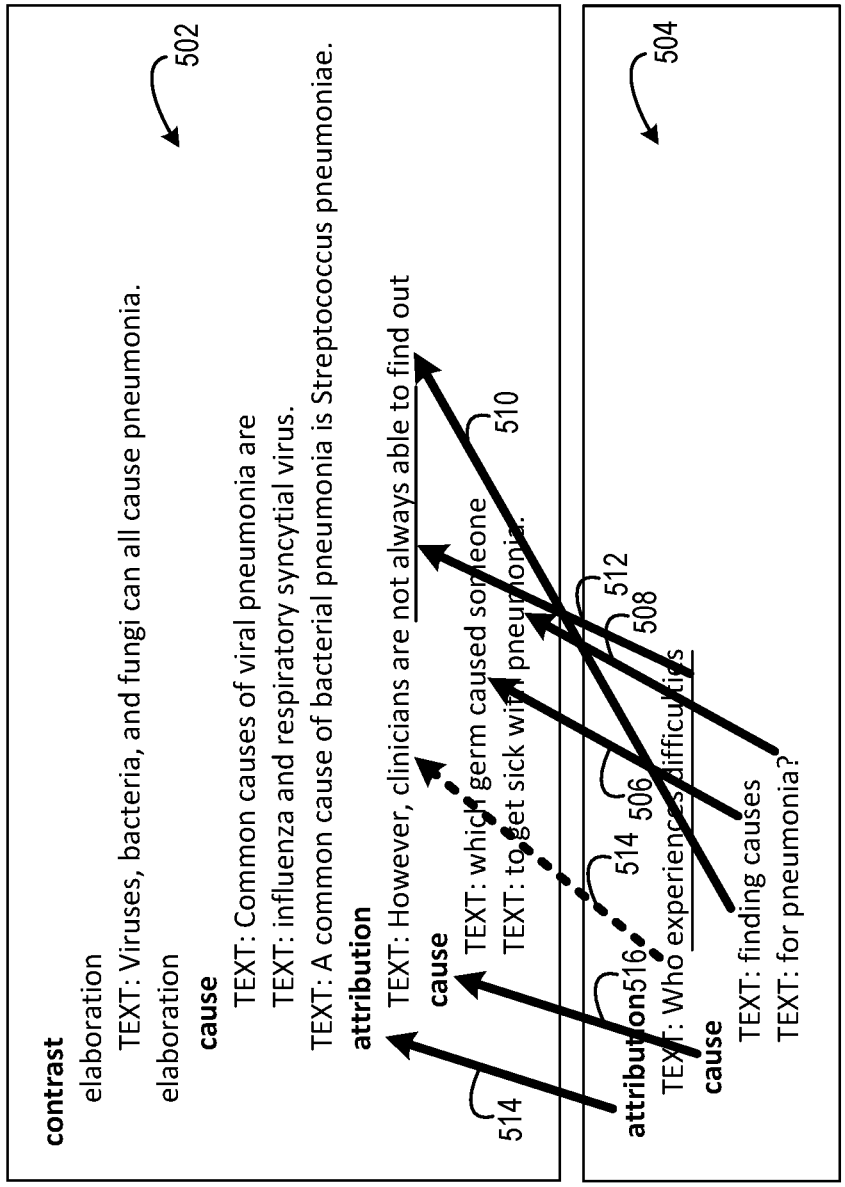
FIG. 5 depicts discourse trees for a question and a textual passage, in accordance with at least one embodiment.

Discourse parser 214 may be configured to execute any suitable discourse parse algorithm to generate a discourse tree from text. The discourse parsing algorithm may implement aspects of rhetorical structure theory to generate the discourse tree. The discourse tree may be generated by identifying elementary discourse units (sentence fragments) in the text (e.g., the question 171, a portion of text 180, etc.). A discourse tree includes nodes. Each nonterminal node of the nodes in the discourse tree represents a rhetorical relationship between two elementary discourse units and each terminal node of the nodes of the discourse tree is associated with an elementary discourse unit. In some embodiments, discourse parser 214 may generate the discourse trees of FIG. 5. FIG. 5 depicts discourse trees for a question and a textual passage, in accordance with at least one embodiment. Discourse tree 502 represents a portion of the text 180 (part of a candidate answer) and discourse tree 504 represents the questions 171 of FIG. 1.

FIG. 5 depicts solid arrows show mapping between the words 'causes'→'caused' (arrow 506), 'pneumonia'→'pneumonia' (arrow 508), 'finding'→'find' (arrow 510) and synonymous phrase 'experience difficulties'→'are not always able to' (arrow 512). Dashed arrow 514 show the target mapping delivering the correct answer 'Who'→'clinicians'. Discourse tree 502 is more detailed and includes shorter EDUs than usually delivered by discourse parsers. It is used here for illustrative purposes. Also, the rhetorical relation of cause is unreliable in most discourse parsers and its detection is based on specific enhancement targeting infrequent rhetorical relations associated with explanation, argumentation etc. Arrow 514 depicts a mapping between the attribution of the question and the attribution of the candidate answer. Arrow 516 depicts a mapping between the cause of the question and the cause of the candidate answer. The discourse data generated by the discourse parser 214, and corresponding mappings between words of the question 171 and any suitable portion of the candidate answer (e.g., any suitable portion of text 180) may be utilized as an indication of the words from the question 171 and text 180 that include a related subset of words of discourse-level importance.

Once respective linguistic data (e.g., semantic data, syntactic data, and discourse data such as that described above and depicted in FIGS. 3-5) has been generated for the question and candidate answer using the syntactic, semantic, and discourse parsing discussed above, the functionality of the generalization component 204 may be invoked.

Figure 6:
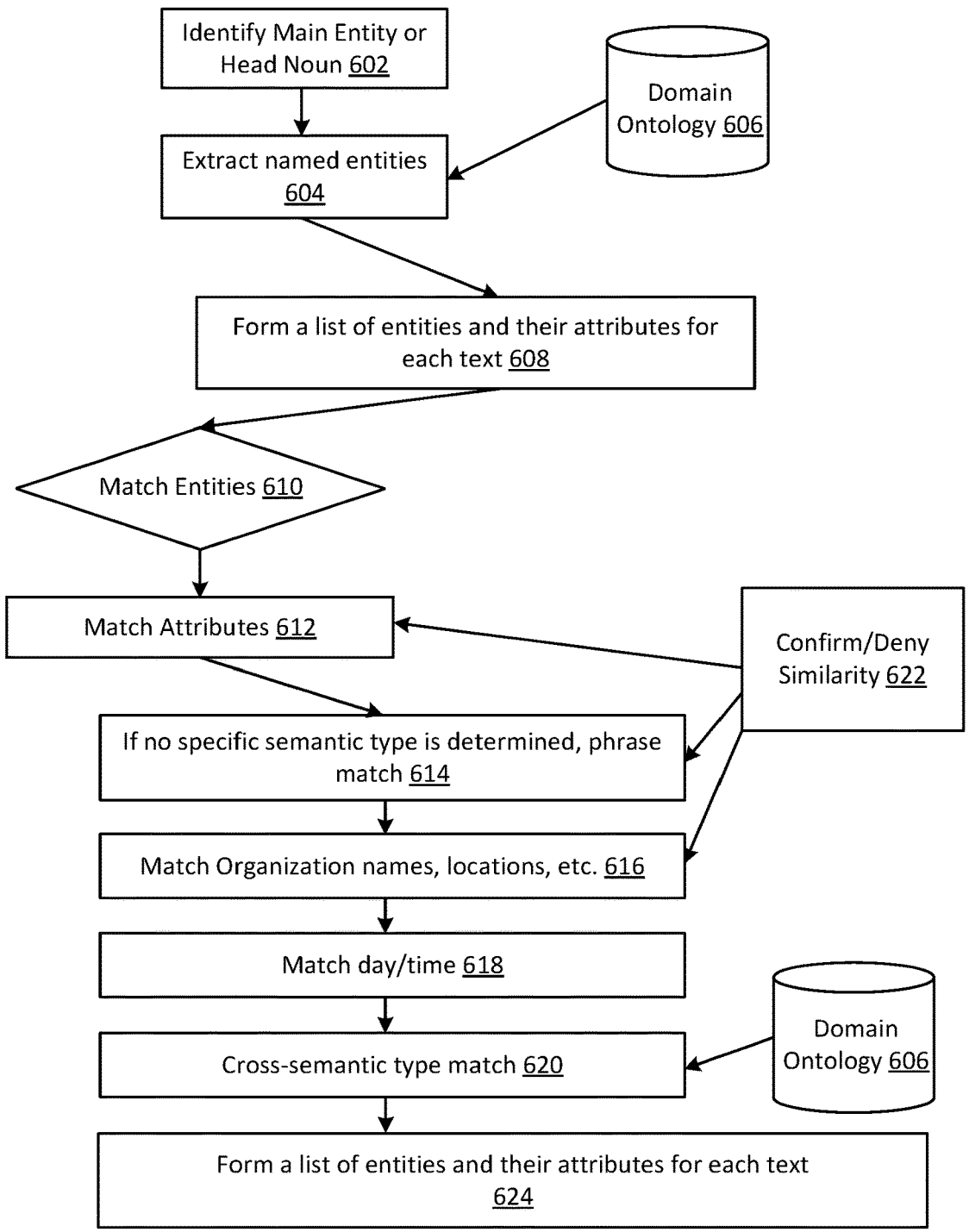
FIG. 6 depicts an example flow for a process performed by a generalization component, in accordance with at least one embodiment.

FIG. 6 depicts an example flow for a process 600 performed by a generalization component (e.g., the generalization component 204 of FIG. 2), in accordance with at least one embodiment. In some embodiments, the generalization component may receive the linguistic data (any of the data discussed above as being generated by the linguistic data preparation component of FIG. 2) generated by the linguistic data preparation component 202 of FIG. 2. The steps described in connection with process 600 may be performed on the question and/or a candidate answer. For example, the process 600 can be performed with question 171 and text 180 (or any suitable portion of text 180) of FIG. 1.

At 602, a predefined rule set may be utilized to identify a main entity or head noun. In some embodiments, this may utilize the syntactic data or any suitable portion of the linguistic data provided by the linguistic data preparation component 202.

At 604, a domain ontology (e.g., domain ontology 606) may be accessed to extract named entities from each text (e.g., question 171 and any suitable portion of text 180). In some embodiments, the domain ontology may include any suitable number of entities and relationships between these entities and corresponding attributes. Domain ontology 606 may be pre-defined and generated prior to run time. Entities may include phrases, organizations, names, people, locations, days, times, semantic types, and the like. In some embodiments, two entities such as organization, person, location or time can be matched against each other unless there is an entry in the ontology that related two entities of different types, like JeffBesos—isCEO—Amazon.

At 608, a list of entities and corresponding attributes for each text is formed.

At 610, for each entity for which a match within the ontology is not found, additional alternate matches may be attempted. For example, an entity from the question may be matched with an entity from the answer at 612 based at least in part on comparing semantic types of each entity. If no specific semantic type is determined, phrases of the question and answer may be matched at 614.

At 616, organization, names, location, and the like may be matched between question and answer (e.g., the portion of text 180). Geo locations, addresses, points of interest can be generalized into the location range or common properties (if available). Locations may be generalized as a range that spans the locations of both. For example, (Lattutude1, Longtitude1)^(Latitude 2, Longitude2)=range [(Latitude 1, Longitude1), (Latitude 2, Longtitude2)], Latitude, Longtitude^Location name=range [(Latitude, Longitude), (Latitude$_{Loc}$, Longitude$_{Loc}$)] which includes/covers the Lat/Long of this Location, if below certain distance threshold.

At 618, times and dates may be generalized as a range spanning the events from both texts occur. In some embodiments, generalization is empty if these events are too distant in time.

At 620, cross-semantic type matches can be determined. For example, if time and space points or ranges are related, they can be generalized together with a relation between them occur$_1$ (Location1, Time1)^occur$_2$ (Location2, Time2) ={(occur$_1$^occur$_2$)(Location1^Location2, Time1^Time2), occur$_1$ (Location1^Location2, Time1^Time2), occur$_2$ (Location1^Location2, Time1^Time2), Range1^Range2=∪$_{ij}$ (Range1$_j$^Range2$_j$), computing overlaps of all ranges, for time and space. In some embodiments, this effort may utilize the domain ontology 606 to determine these cross-semantic type matches.

At any suitable time, the generalization component may confirm or deny similarity between these matches at 622. Confirming or denying similarity may include assessing whether a degree of similarity exceeds a predefined threshold. If denied, the match may be removed from the list.

At 624, a list of entities and attributes (e.g., including confirmed matches) for each text may be generated. This list may be stored in any suitable location for subsequent use. In some embodiments, this list may be provided to another component such as the linguistic data preparation component 202, the deep learning component 206, and/or the direct Q-A match component 208, or any suitable combination of the above.

Returning to FIG. 2, any suitable combination of the linguistic data (e.g., the syntactic data including the syntax trees of FIG. 3, semantic data including AMR representations similar to that depicted in FIG. 4 and corresponding to the question and/or text 180, the discourse trees depicted in FIG. 5, or any suitable combination of the same) and the list of entities and corresponding attributes for each text (e.g., the question 171 and any suitable portion of the text 180) may be provided to the enhancement module 216 as input. In some embodiments, the entity/attribute representation generated by the process 600, and any suitable linguistic data may be merged into a single structure prior to being provided to the enhancement module 216. In some embodiments, to merge this data, nodes may be generated for combining the labels of the nodes of the linguistic data where is a one-to-one correspondence. (syntactic_node=today, Semantic_mode=today, DateTime=today)=>node of the generalization structure=<today, {syntactic_node, semantic(mod), entity_type(DateTime)}>. Notice that the structurized word2vec possesses an explainability feature: the system can provide a full log for a similarity assessment, citing all linguistic features that led to it. In a number of applications this log is visualized.

In some embodiments, enhancement module 216 may be configured to utilize the syntactic data, semantic data, discourse data, and/or entity/attribute data described above to obtain vector representations of individual words. Word2vec can provide representations of the meanings of individual words, while syntactic analysis would direct word2vec into comparing only comparable words, in appropriate positions and roles. Semantic analysis would complement word2vec with meaning where knowledge of context is a key, discourse level analysis would provide insight into the discourse structure of the text and the rhetorical relationships between words, and named-entity analysis extends word2vec in case words name entities instead of having generic meanings. Thus, the aligned linguistic structures provided by the parsers 210-214 and enhancement module 216 can be utilized by word2vec, rather than the original text, to determine vectors to represent the most important words in the question 171 and/or text 180. Any suitable data generated by the linguistic data preparation component 202 may be provided to the deep learning component 206 as input.

In some embodiments, the deep learning component 206 may be configured to perform machine-reading comprehension operations to identify an answer from text 180 for the question 171. In some embodiments, the deep learning component 206 implements a self-attention network (e.g., a multi-head self-attention network).

Figure 7:
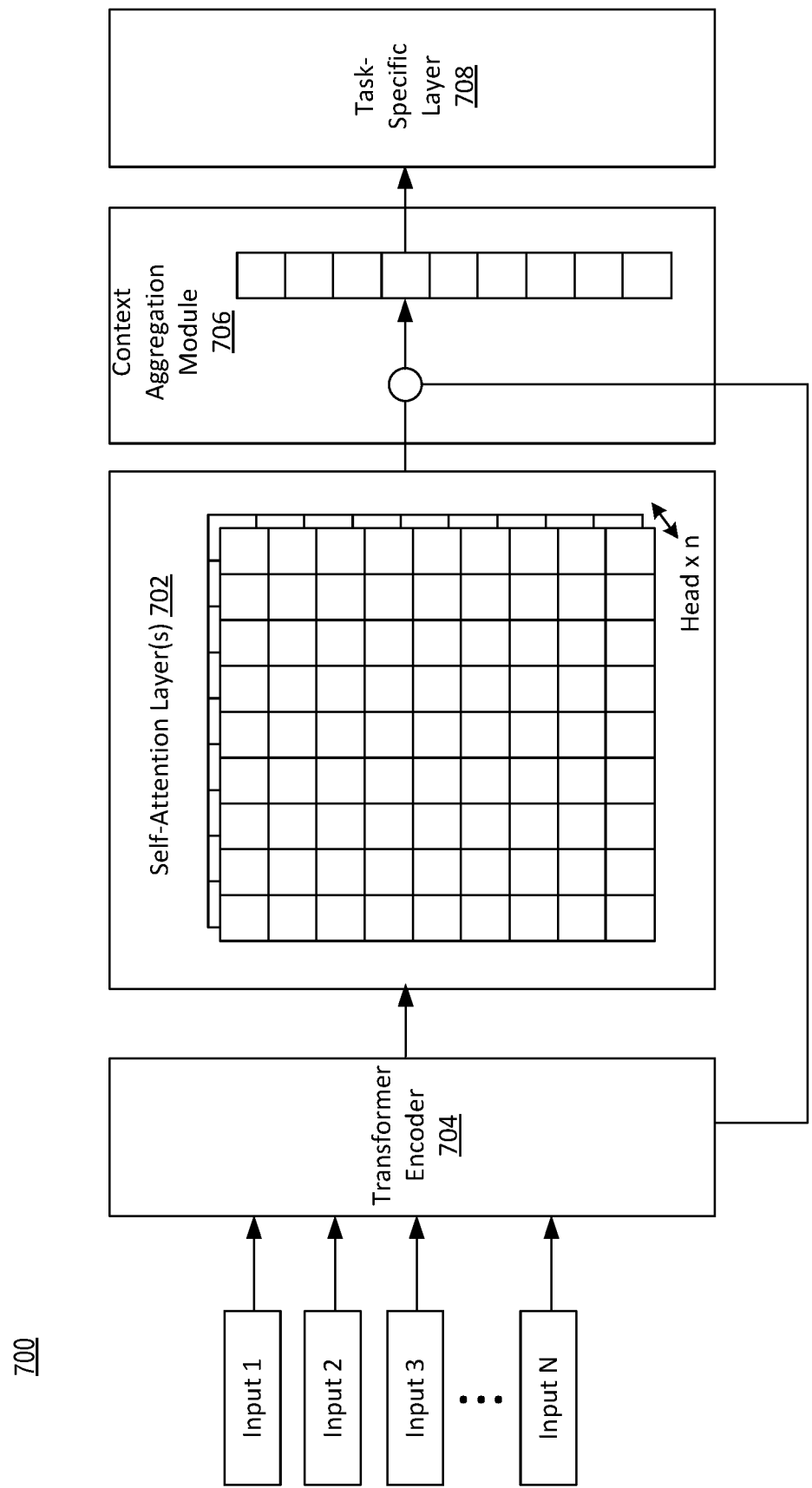
FIG. 7 depicts an example of a self-attention network, in accordance with at least one embodiment.

FIG. 7 depicts an example of a self-attention network 700, in accordance with at least one embodiment. The self-attention network 700 is an example of a transformer neural network that includes a multi-headed self-attention block (e.g., self-attention layer(s) 702) that enables contextual information to be obtained for word embedding inputs. Words may be provided as input (e.g., inputs 1-N) to transformer encoder 704. In some embodiments, transformer encoder 704 may be configured to transform the inputs into word embeddings (e.g., vectors that represent a word) may be provided as input to transformer encoder. The transformer encoder 704 may be configured to take in an input sequence and map it to a higher dimensional space such as an n-dimensional vector. In some embodiments, the transformer encoder 704 tokenizes an input string into multiple tokens. In some embodiments, the input(s) and/or tokens are arranged in different sequences (e.g., every possibly sequence) and fed to the self-attention layer(s) 702. The input(s) and/or tokens (and positional encodings denoting the positions of the tokens within the various sequences) are then fed to the self-attention layer(s) 702.

A self-attention layer(s) 702 each take in the data provided by the transformer encoder 704. The self-attention layer(s) 702 are configured to allow inputs to interact with each other to determine one to which more attention is to be paid. A set of weights may be initialized corresponding to a key, query, and value. Every input may be multiplied with a set of weights for keys, a set of weights for queries, and set of weights for values. Using dot multiplication, the inputs may be multiplied by each set of weights to obtain a key, query, value representation for every input. Attention scores may be obtained by calculating a dot product between with an input's query with all keys, including itself. This may be performed for each input to obtain an attention score for each input. A softmax may be taken across these attention scores and the results multiplied with their corresponding values. This process can be repeated for each input to produce a set of outputs that provide contextual data of the inputs.

The context aggregation module 706 may combine the outputs of the various self-attention layer(s) 702 and provide them to another layer such as the task-specific layer 708, that is configured to perform operations corresponding to the given task.

Returning to FIG. 2, the deep learning component may itself be an example of a multi-head self-attention network that includes transformer encoder 217 (e.g., an example of the transformer encoder 704 of FIG. 7) and multiple self-attention layers (e.g., syntax self-attention layer 218, semantic self-attention layer 220, and discourse self-attention layer 222. Each of these layers may be an example of the self-attention layer(s) 702 of FIG. 7. The syntax self-attention layer 218 may be configured to determine contextual data of inputs from a syntactic level, the semantic self-attention layer 220 may be configured to determine contextual data of inputs from a syntactic level, and the discourse self-attention layer 222 may be configured to determine contextual data of inputs from a discourse level.

The deep learning component 206 transforms word embeddings into contextually-encoded token representations using stacked multi-head self-attention and feedforward layers. To incorporate syntax, one self-attention head is trained to attend to each token's syntactic parent, allowing the model to use this attention head as an oracle for syntactic dependencies. Word embeddings are input to J layers of multi-head self-attention. In layer p one attention head is trained to attend to parse parents. Layer r is input for a joint predicate/POS classifier. Representations from layer r corresponding to predicted predicates are passed to a bilinear operation scoring distinct predicate and role representations to produce per-token semantic role labeling predictions with respect to each predicted predicate.

The model predicts predicates and integrates part-of-speech (POS) information into earlier layers by re-purposing representations closer to the input to predict predicate and POS tags using hard parameter sharing. The optimization is simplified and leverages shared statistical strength derived from highly correlated POS and predicates by treating tagging and predicate detection as a single task, performing multi-class classification into the joint Cartesian product space of POS and predicate labels. Though typical models, which re-encode the sentence for each predicate, can simplify SRL to token-wise tagging, our joint model uses a different approach to classify roles with respect to each predicate. Contextually encoded tokens are projected to distinct predicate and role embeddings, and each predicted predicate is scored with the sequence's role representations using a bilinear model, producing per-label scores for BIO-encoded semantic role labels for each token and each semantic frame.

The input to the network is a sequence X of T token representations $x_t$. In the standard setting these token representations are initialized to pre-trained word embeddings. These input embeddings are projected to a representation that is the same size as the output of the self-attention layers. A positional encoding vector is then added, computed as a deterministic sinusoidal function of t. This token representation is then fed as input to a series of J residual multi-head self-attention layers with feed-forward connections. Denoting the jth self-attention layer as $T^{(j)}(\cdot)$, the output of that layer $s_t^{(j)}$, and $LN(\cdot)$ layer normalization, the following recurrence applied to initial input $c_t^{(p)}$: $s_t^{(j)} = LN(s_t^{(j-1)} + T^{(j)}(s_t^{(j-1)}))$ gives final token representations $s_t^{(j)}$. Each $T^{(j)}(\cdot)$ consists of multi-head self-attention and a feed-forward projection.

The multi-head self-attention consists of H attention heads, each of which learns a distinct attention function to attend to all of the tokens in the sequence. This self-attention is performed for each token for each head, and the results of the H self-attentions are concatenated to form the final self-attended representation for each token.

Specifically, consider the matrix $S^{(j-1)}$ of T token representations at layer j−1. For each attention head h, we project this matrix into distinct key, value and query representations $K_h^{(j)}$, $V_h^{(j)}$ and $Q_h^{(j)}$ of dimensions $T \times d_k$, $T \times d_q$ and $T \times d_q$, respectively. Then $K_h^{(j)}$ is multiplied by $Q_h^{(j)}$ to obtain a $T \times T$ matrix of attention weights $A_h^{(j)}$ between each pair of tokens in the sentence. The scaled dot-product attention is performed: the weights are scaled by the inverse square root of their embedding dimension and normalize with the softmax function to produce a distinct distribution for each token over all the tokens in the sentence: $A_h^{(j)} = \text{softmax}(d_k^{-1/2} Q_h^{(j)} K_h^{(j)T})$. These attention weights are then multiplied by $V_h^{(j)}$ for each token to obtain the self-attended token representations $M_h^{(j)}$: $M_h^{(j)} = A_h^{(j)} V_h^{(j)}$.

Row t of $M_h^{(j)}$, the self-attended representation for token t at layer j, is thus the weighted sum with respect to t (with weights given by $A_h^{(j)}$) over the token representations in $V_h^{(j)}$.

The output of the feed-forward is added to the initial representation and apply layer normalization to give the final output of self-attention layer j.

Typically, neural attention mechanisms are left on their own to learn to attend to relevant inputs. Instead, the self-attention layers may be trained to attend to specific tokens corresponding to the discourse structure of the paragraph as a mechanism for passing linguistic knowledge to later layers. In some embodiments, a deep bi-affine model trained to predict syntactic dependencies may be utilized (e.g., for the syntax self-attention layer 218). Let $A_{parse}$ be the discourse parse attention weights, at layer i. Its input is the matrix of token representations $S^{(i-1)}$. As with the other attention heads, we project $S^{(i-1)}$ into key, value and query representations, denoted $K_{parse}$, $Q_{parse}$, $V_{parse}$. Here the key and query projections correspond to parent and dependent representations of the tokens, and we allow their dimensions to differ from the rest of the attention heads. Unlike the other attention heads which use a dot product to score key-query pairs, we score the compatibility between $K_{parse}$ and $Q_{parse}$ using a bi-affine operator $U_{heads}$ to obtain attention weights: $A_{parse}=\text{softmax}(Q_{parse} U_{heads} K_{parse}^T)$. These attention weights are used to compose a weighted average of the value representations $V_{parse}$ as in the other attention heads.

An auxiliary supervision is applied at this attention head to encourage it to attend to each token's parent in an entity discourse tree, and to encode information about the token's dependency label in discourse and syntactic dependency trees. Denoting the attention weight from token t to a candidate head q as $A_{parse}[t, q]$, we model the probability of token t having parent q as: $P(q=\text{head}(t)|X)=A_{parse}[t, q]$ using the attention weights $A_{parse}[t]$ as the distribution over possible heads for token t. The root token is defined as one having a self-loop. This attention head thus emits a directed graph where each token's parent is the token to which the attention $A_{parse}$ assigns the highest weight. Dependency labels are predicted using per class bi-affine operations between parent and dependent representations $Q_{parse}$ and $K_{parse}$, to produce per-label scores, with locally normalized probabilities over dependency labels $y_t^{dep}$ given by the softmax function.

This attention head now becomes an oracle for linguistic features, denoted P, providing a discourse and syntactic dependency parse to downstream layers. This model not only predicts its own dependency arcs, but can allow for the injection of auxiliary parse information at test time by simply setting a parse to the parse parents produced by discourse and syntactic parser. In this way, the model can benefit from improved, external parsing models without re-training. Unlike typical multi-task models, ours maintains the ability to leverage external syntactic information.

Given input token sequence $S=\{s_1, s_2, \ldots, s_n\}$ of length n, we first subject it to syntactic parsing to generate a dependency tree. Then, the ancestor node set $P_i$ is derived for each word $s_i$ traversing the dependency tree. Finally, a syntactic dependency of interest sequence of mask M is obtained, organized as n □ n matrix, and elements in each row denote the dependency mask of all words to the row-index word. If M [i, j]=1, it means that token $s_i$ is the ancestor node of token $s_j$.

$$M[i, j] = \begin{cases} 1, & \text{if } j \in P_i \text{ or } j = i \\ 0, & \text{otherwise} \end{cases}.$$

The last layer output H is projected from the transformer into the distinct key, value, and query representations of dimensions $<L \times d_k, L \times d_q, L \times d_v>$, respectively, denoted $<K_i' Q_i' V_i'>$ for each head word i. Then a dot product is computed to score key-query pairs with the dependency of interest mask to obtain attention weights of dimension L×L, denoted A 0:

$$A_i' = \text{Softmax}\left(\frac{M \cdot (Q_i' K_i'^T)}{\sqrt{d_k}}\right).$$

We then the attention weight $A_i'$ is multiplied by $V_i'$ to obtain the syntax-guided token representations: $W_i'=A_i'V_i'W_i'$ for all heads are concatenated and passed through a feed-forward layer. After passing through another feed-forward layer, a layer normalization is applied to the sum of output and initial representation to obtain the final representation, denoted as $H_0'=\{h_0', h_1', \ldots, h_n'\}$.

Context Aggregation Module 224, an example of the context aggregation module 706 of FIG. 7, may be configured to aggregate the outputs of the layers 218-222. Once the syntactic, semantic, and discourse vectors and corresponding contextual data is obtained, it may be fed to an MRC layer 226 (e.g., an example of the task-specific layer 708 to generate an answer for the question.

The output of the MRC layer 226 may be provided to direct Q-A match component 208. Component 208 may be configured to utilize the answer identified by the MRC layer 226 and validate the answer based on comparing the entities/attributes identified by the generalization component 204 and entities/attributes identified in the answer. If these match over a threshold amount, the answer identified by the MRC layer 226 (e.g., answer 228) is deemed acceptable and provided (e.g., by the autonomous agent 112 of FIG. 1) in response to the question provided at 201.

Figure 8:
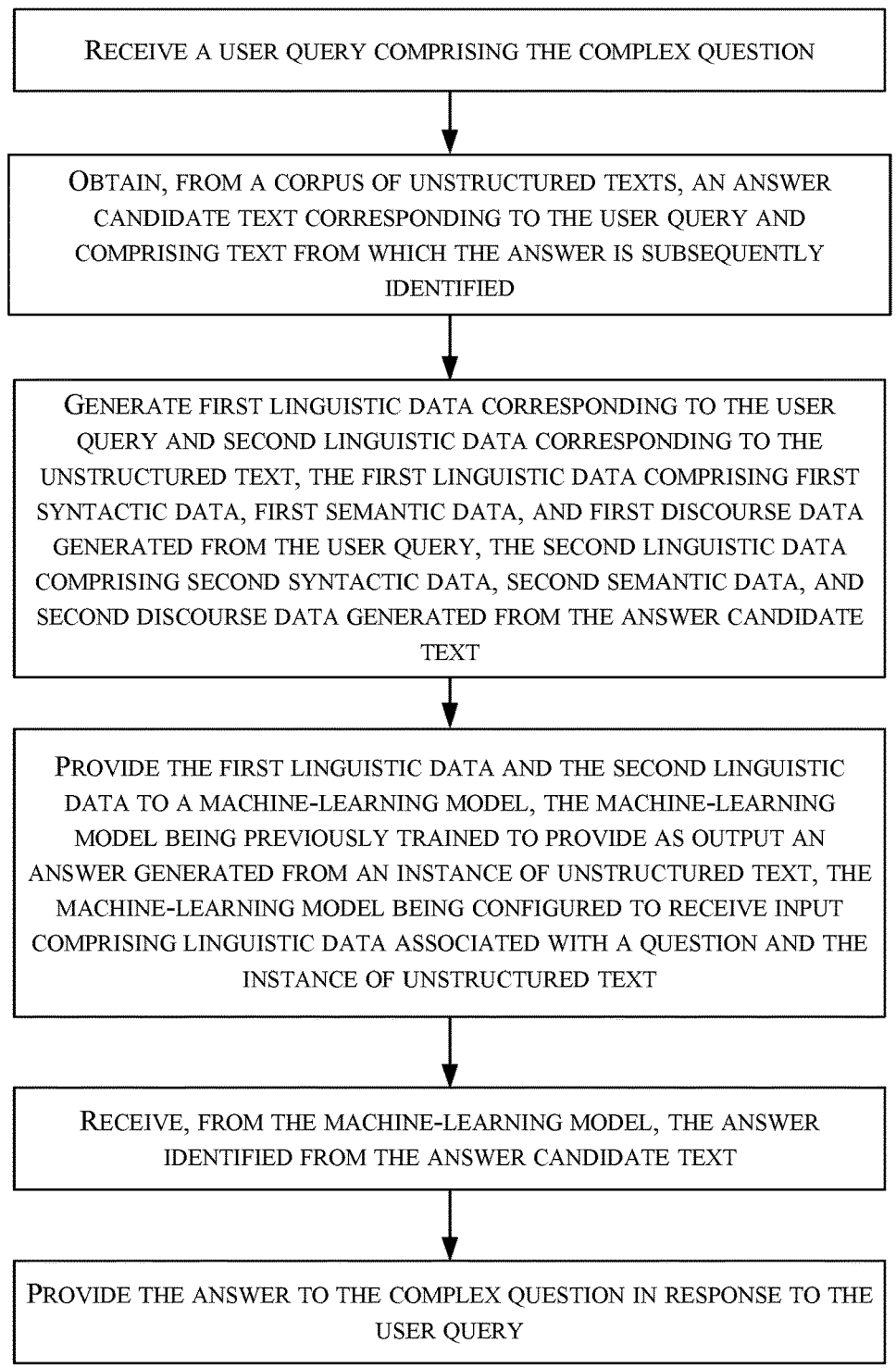
FIG. 8 depicts a flowchart illustrating an example method for identifying an answer to a complex question from unstructured text, in accordance with at least one embodiment.

FIG. 8 depicts a flowchart illustrating an example of a method 800 for identifying an answer (e.g., boundaries of an answer) to a complex query, in accordance with at least one embodiment. In some embodiments, the method 800 may be performed by the autonomous agent 112 of FIG. 1. The steps of method 800 may be performed in any suitable order. In some embodiments, the method 800 may include more operations than those depicted in FIG. 8, or fewer operations than those depicted in FIG. 8.

The method 800 may begin at 802, where a user query comprising the complex question is received (e.g., from the user device 160 of FIG. 1).

At 804, unstructured text (e.g., referred to as "an answer candidate text") corresponding to the user query may be obtained from a corpus of unstructured texts (e.g., the knowledge database 120 of FIG. 1). In some embodiments, the answer candidate text comprises text from which the answer is subsequently identified.

At 806, first linguistic data corresponding to the user query and second linguistic data corresponding to the answer candidate text may be generated. In some embodiments, the first linguistic data comprises first syntactic data, first semantic data, and first discourse data generated from the user query. In some embodiments, the second linguistic data comprises second syntactic data, second semantic data, and second discourse data generated from the answer candidate text.

At 808, the first linguistic data and the second linguistic data are provided to a machine-learning model. In some embodiments, the machine-learning model may be previously trained to provide as output an answer generated from an instance of unstructured text. In some embodiments, the machine-learning model is configured to receive input comprising linguistic data associated with a question and the instance of unstructured text.

At 810, the answer identified from the answer candidate text is received from the machine-learning model.

At 812, the answer to the complex question is provided in response to the user query.

Exemplary Computing Systems

Figure 9:
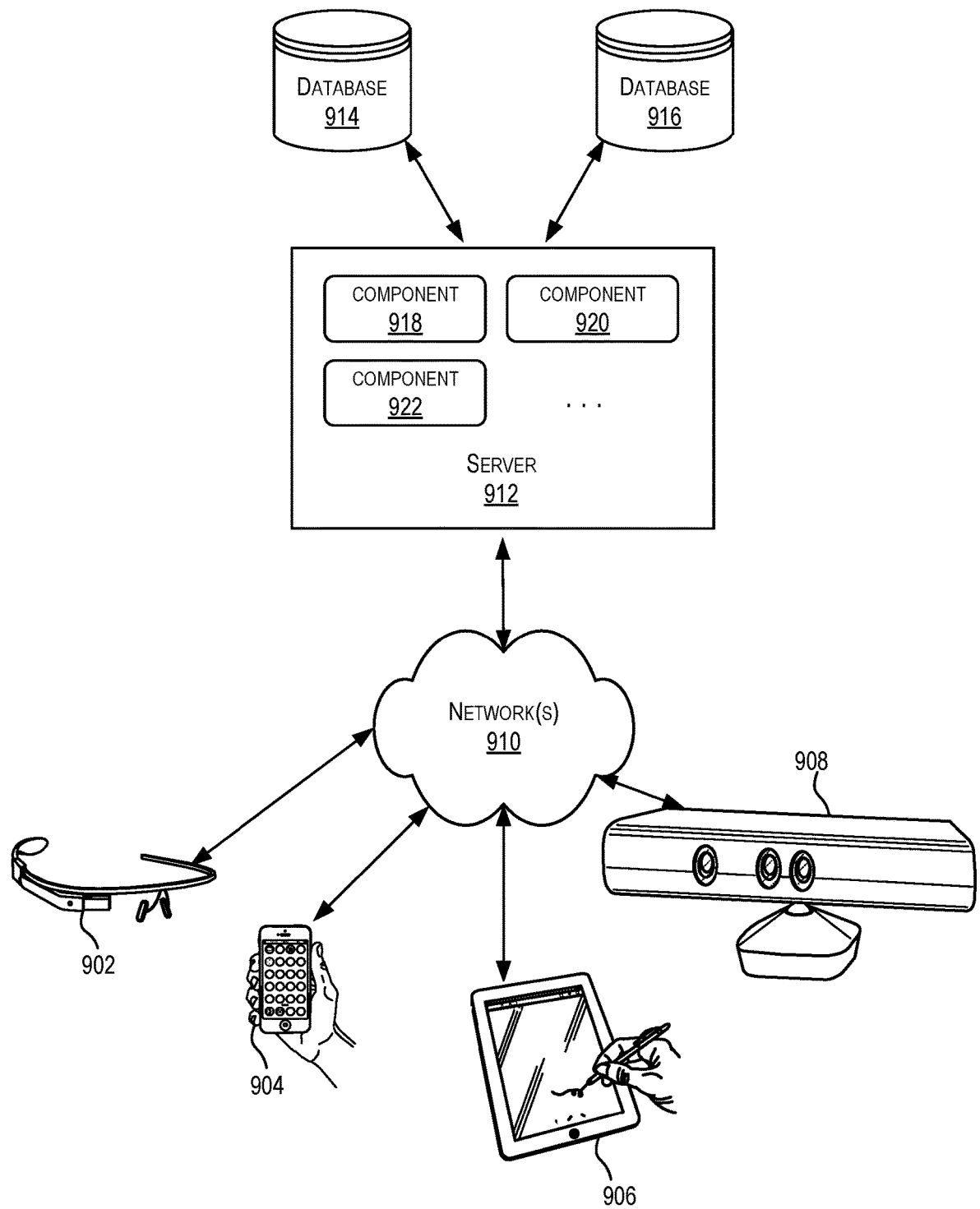
FIG. 9 depicts a simplified diagram of a distributed system for implementing one of the aspects, in accordance with at least one embodiment.

FIG. 9 depicts a simplified diagram of a distributed system 900 for implementing one of the aspects. In the illustrated aspect, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various aspects, server 912 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of distributed system 900 are shown as being implemented on server 912. In other aspects, one or more of the components of distributed system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The aspect shown in the figure is thus one example of a distributed system for implementing an aspect system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including, without limitation, the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including, without limitation, a virtual private network (VPN), an intranet, an extranet, a public switched telephone network (PSTN), an infra-red network, a wireless network (e.g., a network operating under any of the Institute of Electrical and Electronics Engineers (IEEE) 802.9 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization. One or more flexible pools of logical storage devices can be virtualized to maintain virtual storage devices for the server. Virtual networks can be controlled by server 912 using software defined networking. In various aspects, server 912 may be adapted to run one or more services or software applications described in the foregoing disclosure. For example, server 912 may correspond to a server for performing processing described above according to an aspect of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of aspects, databases 914 and 916 may reside in a storage-area network (SAN). Similarly, any necessary files for performing the functions attributed to server 912 may be stored locally on server 912 and/or remotely, as appropriate. In one set of aspects, databases 914 and 916 may include relational databases, such as databases provided by Oracle, that are adapted to store, update, and retrieve data in response to SQL-formatted commands.

Figure 10:
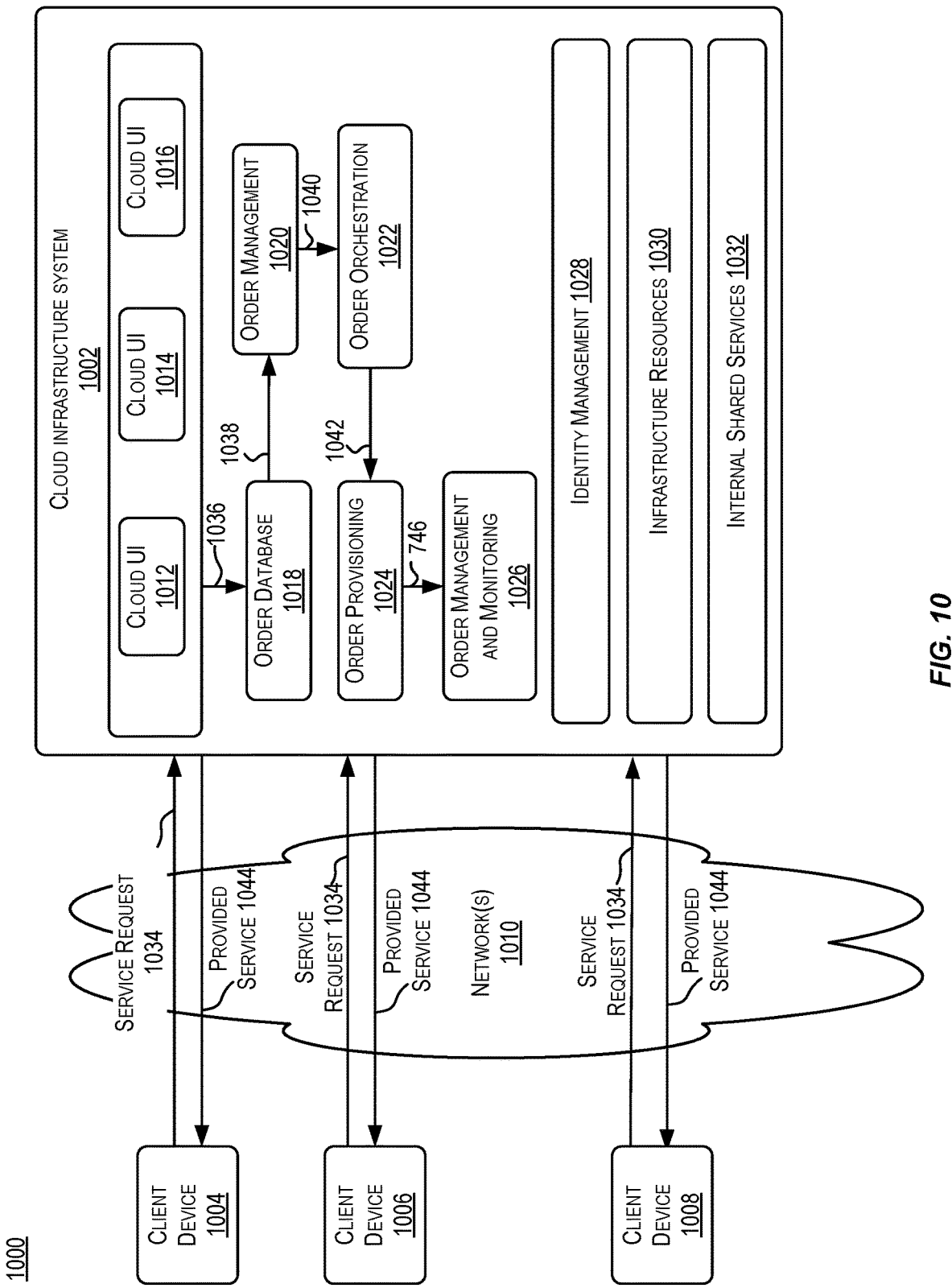
FIG. 10 is a simplified block diagram of one or more components of a system environment by which services provided by one or more components of an aspect system may be offered as cloud services, in accordance with an aspect of the present disclosure, in accordance with at least one embodiment.

FIG. 10 is a simplified block diagram of one or more components of a system environment 1000 by which services provided by one or more components of an aspect system may be offered as cloud services, in accordance with an aspect of the present disclosure. In the illustrated aspect, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the aspect shown in the figure is only one example of a cloud infrastructure system that may incorporate an aspect of the invention. In some other aspects, cloud infrastructure system 1002 may have more or fewer components than shown in the figure, may combine two or more components, or may have a different configuration or arrangement of components.

Client computing devices 1004, 1006, and 1008 may be devices similar to those described above for client computing devices 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients computing devices 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some aspects, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some aspects, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1002 may also include infrastructure resources 1030 for providing the resources used to provide various services to customers of the cloud infrastructure system. In one aspect, infrastructure resources 1030 may include pre-integrated and optimized combinations of hardware, such as servers, storage, and networking resources to execute the services provided by the PaaS platform and the SaaS platform.

In some aspects, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1002 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1002, and the like.

In one aspect, as depicted in the figure, cloud management functionality may be provided by one or more modules, such as an order management module 1020, an order orchestration module 1022, an order provisioning module 1011, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client computing device 1004, 1006 or 1008, may interact with cloud infrastructure system 1002 by requesting one or more services provided by cloud infrastructure system 1002 and placing an order for a subscription for one or more services offered by cloud infrastructure system 1002. In certain aspects, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 in which the customer intends to subscribe.

After an order has been placed by the customer, the order information is received via the cloud UIs, 1010, 1014 and/or 1016.

At operation 1036, the order is stored in order database 1018. Order database 1018 can be one of several databases operated by cloud infrastructure system 1002 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1011.

In certain aspects, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1011 to allocate resources and configure those resources needed to fulfill the subscription order. Order provisioning module 1011 enables the allocation of resources for the services ordered by the customer. Order provisioning module 1011 provides a level of abstraction between the cloud services provided by cloud infrastructure system 1002 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client computing devices 1004, 1006 and/or 1008 by order provisioning module 1011 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain aspects, cloud infrastructure system 1002 may include an identity management module 1028. Identity management module 1028 may be configured to provide identity services, such as access management and authorization services in cloud infrastructure system 1002. In some aspects, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.). Identity management module 1028 may also include the management of descriptive information about each customer and about how and by whom that descriptive information can be accessed and modified.

Figure 11:
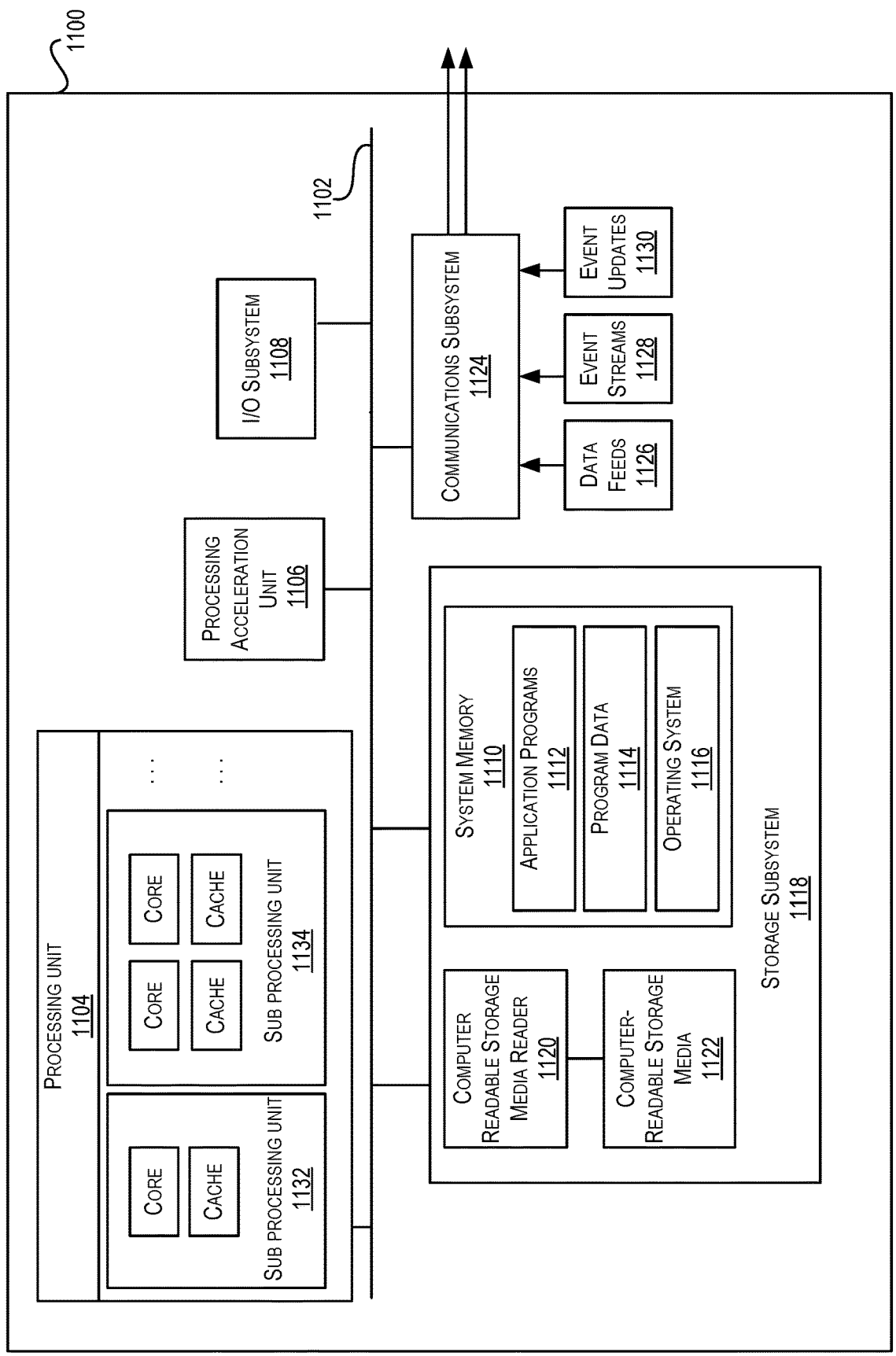
FIG. 11 illustrates an exemplary computing subsystem, in which various aspects may be implemented, in accordance with at least one embodiment.

FIG. 11 illustrates an exemplary computing subsystem 1100, in which various aspects may be implemented. The computing subsystem 1100 may be used to implement any of the computing subsystems described above. As shown in the figure, computing subsystem 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1111. Storage subsystem 1118 includes tangible computer-readable storage media 119 and a system memory 1110.

Bus subsystem 1102 provides a mechanism for letting the various components and subsystems of computing subsystem 1100 communicate with each other as intended. Although bus subsystem 1102 is shown schematically as a single bus, alternative aspects of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1186.1 standard.

Processing unit 1104, which can be implemented as one or more integrated circuits (e.g., a conventional microprocessor or microcontroller), controls the operation of computing subsystem 1100. One or more processors may be included in processing unit 1104. These processors may include single-core or multicore processors. In certain aspects, processing unit 1104 may be implemented as one or more independent processing units 1132 and/or 1134 with single or multicore processors included in each processing unit. In other aspects, processing unit 1104 may also be implemented as a quad-core processing unit formed by integrating two dual-core processors into a single chip.

In various aspects, processing unit 1104 can execute a variety of programs in response to program code and can maintain multiple concurrently executing programs or processes. At any given time, some or all of the program code to be executed can be resident in processing unit(s) 1104 and/or in storage subsystem 1118. Through suitable programming, processing unit(s) 1104 can provide various functionalities described above. Computing subsystem 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing subsystem 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computing subsystem 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computing subsystem 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computing subsystem 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some aspects. Software (programs, code modules, instructions) that when executed by a processor, provides the functionality described above and may be stored in storage subsystem 1118. These software modules or instructions may be executed by processing unit 1104. Storage subsystem 1118 may also provide a repository for storing data used in accordance with the present invention.

Storage subsystem 1118 may also include a computer-readable storage media reader 1120 that can further be connected to computer-readable storage media 119. Together and, optionally, in combination with system memory 1110, computer-readable storage media 119 may comprehensively represent remote, local, fixed, and/or removable storage devices plus storage media for temporarily and/or more permanently containing, storing, transmitting, and retrieving computer-readable information.

Computer-readable storage media 119 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing subsystem 1100.

By way of example, computer-readable storage media 119 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 119 may include, but is not limited to, Zip® drives, flash memory cards, universal serial bus (USB) flash drives, secure digital (SD) cards, DVD disks, digital video tape, and the like. Computer-readable storage media 119 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computing subsystem 1100.

Communications subsystem 1111 provides an interface to other computing subsystems and networks. Communications subsystem 1111 serves as an interface for receiving data from and transmitting data to other systems from computing subsystem 1100. For example, communications subsystem 1111 may enable computing subsystem 1100 to connect to one or more devices via the Internet. In some aspects, communications subsystem 1111 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.9 family standards, or other mobile communication technologies, or any combination thereof), global positioning system (GPS) receiver components, and/or other components. In some aspects, communications subsystem 1111 can provide wired network connectivity (e.g., Ethernet) in addition to or instead of a wireless interface.

In some aspects, communications subsystem 1111 may also receive input communication in the form of structured and/or unstructured data feeds 1126, event streams 1128, event updates 1130, and the like on behalf of one or more users who may use computing subsystem 1100.

By way of example, communications subsystem 1111 may be configured to receive unstructured data feeds 1126 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1111 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1111 may also be configured to output the structured and/or unstructured data feeds 1126, event streams 1128, event updates 1130, and the like to one or more databases that may be in communication with one or more streaming data source computers coupled to computing subsystem 1100.

Computing subsystem 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computing subsystem 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of identifying an answer to a complex question from unstructured text, the method comprising:
    receiving a user query comprising the complex question;
    obtaining, from a corpus of unstructured texts, an answer candidate text corresponding to the user query and comprising text from which the answer is subsequently identified;
    generating first linguistic data corresponding to the user query and second linguistic data corresponding to the answer candidate text, the first linguistic data comprising first syntactic data, first semantic data, and first discourse data generated from the user query, the second linguistic data comprising second syntactic data, second semantic data, and second discourse data generated from the answer candidate text;
    providing the first linguistic data, the second linguistic data, and the answer candidate text to a self-attention neural network comprising at least a syntax self-attention layer, a semantic self-attention layer, and a discourse self-attention layer, the self-attention neural network being previously trained to generate a corresponding answer from an instance of unstructured text based at least in part on the complex question, the self-attention neural network being configured to receive input comprising linguistic data associated with a question and separate linguistic data associated with the instance of unstructured text;
    receiving the answer generated by the self-attention neural network; and
    providing the answer in response to the complex question of the user query.

2. The method of claim 1, wherein generating the first linguistic data comprises:
    generating a syntax tree from the user query, the syntax tree comprising a first set of nodes and a first set of edges, the first set of nodes representing individual words of the user query, the first set of edges representing a syntactic relationship between respective pairs of words;
    generating an abstract meaning representation of the user query, the abstract meaning representation comprising a directed acyclic graph comprising a second set of nodes and a second set of edges, the second set of nodes representing words of the user query, the second set of edges representing semantic relationships between pairs of words; and generating a discourse tree from the user query, the discourse tree comprising a third set of nodes and a third set of edges, the third set of nodes representing the words of the user query, the third set of edges representing rhetorical relationships between corresponding pairs of the words.

3. The method of claim 1, wherein generating the second linguistic data comprises:

generating a syntax tree from the answer candidate text, the syntax tree comprising a first set of nodes and a first set of edges, the first set of nodes representing individual words of the answer candidate text, the first set of edges representing a syntactic relationship between respective pairs of words;

generating an abstract meaning representation of the answer candidate text, the abstract meaning representation comprising a directed acyclic graph comprising a second set of nodes and a second set of edges, the second set of nodes representing words of the answer candidate text, the second set of edges representing semantic relationships between pairs of words; and generating a discourse tree from the answer candidate text, the discourse tree comprising a third set of nodes and a third set of edges, the third set of nodes representing the words of the answer candidate text, the third set of edges representing rhetorical relationships between elementary discourse units.

4. The method of claim 1, wherein the self-attention neural network is trained to generate a word embedding from data provided as input, the word embedding representing each word of the input and corresponding importance weights for each word, the corresponding importance weights being generated by respective layers of the self-attention neural network based on at least one of: a syntactic relationship, a semantic relationship, or a rhetorical relationship between pairs of words.

5. The method of claim 1, further comprising:
identifying, based at least in part on a domain-specific ontology, one or more entities of at least one of the user query or the answer candidate text; and
for each of the one or more entities, identifying, from the domain-specific ontology, one or more attributes of each entity.

6. The method of claim 5, further comprising validating the answer based on the one or more entities or one or more attributes identified for the user query or the answer candidate text.

7. The method of claim 6, wherein validating the answer further comprises:
calculating a syntactic generalization score between a first set of entities identified in the answer and a second set of entities identified in the user query; and
determining that the answer is valid based at least in part on identifying the syntactic generalization score exceeds a predefined threshold value.

8. A computing device, comprising:
one or more processors; and
one or more memories storing computer-executable instructions for generating an answer to a complex question from unstructured text, that, when executed by the one or more processors, cause the computing device to:

receive a user query comprising the complex question;
obtain, from a corpus of unstructured texts, an answer candidate text corresponding to the user query and comprising text from which the answer is subsequently generated;
generate first linguistic data corresponding to the user query and second linguistic data corresponding to the answer candidate text, the first linguistic data comprising first syntactic data, first semantic data, and first discourse data generated from the user query, the second linguistic data comprising second syntactic data, second semantic data, and second discourse data generated from the unstructured text;
provide the first linguistic data, the second linguistic data, and the answer candidate text to a self-attention neural network comprising at least a syntax self-attention layer, a semantic self-attention layer, and a discourse self-attention layer, the self-attention neural network being previously trained to generate a corresponding answer from an instance of unstructured text based at least in part on the complex question, the self-attention neural network being configured to receive input comprising linguistic data associated with a question and separate linguistic data associated with the instance of unstructured text;
receive the answer generated by the self-attention neural network; and
provide the answer in response to the complex question of the user query.

9. The computing device of claim 8, wherein generating the first linguistic data further causes the computing device to:

generate a syntax tree from the user query, the syntax tree comprising a first set of nodes and a first set of edges, the first set of nodes representing individual words of the user query, the first set of edges representing a syntactic relationship between respective pairs of words;

generate an abstract meaning representation of the user query, the abstract meaning representation comprising a directed acyclic graph comprising a second set of nodes and a second set of edges, the second set of nodes representing words of the user query, the second set of edges representing semantic relationships between pairs of words; and generate a discourse tree from the user query, the discourse tree comprising a third set of nodes and a third set of edges, the third set of nodes representing the words of the user query, the third set of edges representing rhetorical relationships between corresponding pairs of the words.

10. The computing device of claim 8, wherein generating the second linguistic data further causes the computing device to:

generate a syntax tree from the answer candidate text, the syntax tree comprising a first set of nodes and a first set of edges, the first set of nodes representing individual words of the answer candidate text, the first set of edges representing a syntactic relationship between respective pairs of words;

generate an abstract meaning representation of the answer candidate text, the abstract meaning representation comprising a directed acyclic graph comprising a second set of nodes and a second set of edges, the second set of nodes representing words of the answer candidate text, the second set of edges representing semantic relationships between pairs of words; and generate a discourse tree from the answer candidate text, the discourse tree comprising a third set of nodes and a third set of edges, the third set of nodes representing the words of the answer candidate text, the third set of edges representing rhetorical relationships between elementary discourse units.

11. The computing device of claim 8, wherein the self-attention neural network is trained to generate a word embedding from data provided as input, the word embedding representing each word of the input and corresponding importance weights for each word, the corresponding importance weights being generated by respective layers of the self-attention neural network based on at least one of: a syntactic relationship, a semantic relationship, or a rhetorical relationship between pairs of words.

12. The computing device of claim 8, wherein executing the computer-executable instructions further causes the computing device to:
identify, based at least in part on a domain-specific ontology, one or more entities of at least one of the user query or the answer candidate text; and
for each of the one or more entities, identify, from the domain-specific ontology, one or more attributes of each entity.

13. The computing device of claim 12, wherein executing the computer-executable instructions further causes the computing device to validate the answer based on the one or more entities or one or more attributes identified for the user query or the answer candidate text.

14. The computing device of claim 13, wherein executing the computer-executable instructions to validate the answer further causes the computing device to:
calculate a syntactic generalization score between a first set of entities identified in the answer and a second set of entities identified in the user query; and
determine that the answer is valid based at least in part on identifying the syntactic generalization score exceeds a predefined threshold value.

15. A non-transitory computer readable medium storing instructions for identifying an answer to a complex question from unstructured text, that, when executed by one or more processors of a computing device, cause the computing device to:
receive a user query comprising the complex question;
obtain, from a corpus of unstructured texts, an answer candidate text corresponding to the user query and comprising text from which the answer is subsequently identified;
generate first linguistic data corresponding to the user query and second linguistic data corresponding to the answer candidate text, the first linguistic data comprising first syntactic data, first semantic data, and first discourse data generated from the user query, the second linguistic data comprising second syntactic data, second semantic data, and second discourse data generated from the answer candidate text;
provide the first linguistic data, the second linguistic data, and the answer candidate text to a self-attention neural network comprising at least a syntax self-attention layer, a semantic self-attention layer, and a discourse self-attention layer, the self-attention neural network being previously trained to generate a corresponding answer from an instance of unstructured text based at least in part on the complex question, the self-attention neural network being configured to receive input comprising linguistic data associated with a question and separate linguistic data associated with the instance of unstructured text;
receive the answer generated by the self-attention neural network; and
provide the answer in response to the complex question of the user query.

16. The non-transitory computer readable medium of claim 15, wherein generating the first linguistic data further causes the computing device to:
generate a syntax tree from the user query, the syntax tree comprising a first set of nodes and a first set of edges, the first set of nodes representing individual words of the user query, the first set of edges representing a syntactic relationship between respective pairs of words;
generate an abstract meaning representation of the user query, the abstract meaning representation comprising a directed acyclic graph comprising a second set of nodes and a second set of edges, the second set of nodes representing words of the user query, the second set of edges representing semantic relationships between pairs of words; and
generate a discourse tree from the user query, the discourse tree comprising a third set of nodes and a third set of edges, the third set of nodes representing the words of the user query, the third set of edges representing rhetorical relationships between corresponding pairs of the words.

17. The non-transitory computer readable medium of claim 15, wherein generating the second linguistic data further causes the computing device to:
generate a syntax tree from the answer candidate text, the syntax tree comprising a first set of nodes and a first set of edges, the first set of nodes representing individual words of the answer candidate text, the first set of edges representing a syntactic relationship between respective pairs of words;
generate an abstract meaning representation of the answer candidate text, the abstract meaning representation comprising a directed acyclic graph comprising a second set of nodes and a second set of edges, the second set of nodes representing words of the answer candidate text, the second set of edges representing semantic relationships between pairs of words; and
generate a discourse tree from the answer candidate text, the discourse tree comprising a third set of nodes and a third set of edges, the third set of nodes representing the words of the answer candidate text, the third set of edges representing rhetorical relationships between elementary discourse units.

18. The non-transitory computer readable medium of claim 15, wherein the self-attention neural network is trained to generate a word embedding from data provided as input, the word embedding representing each word of the input and corresponding importance weights for each word, the corresponding importance weights being generated by respective layers of the self-attention neural network based on at least one of: a syntactic relationship, a semantic relationship, or a rhetorical relationship between pairs of words.

19. The non-transitory computer readable medium of claim 15, wherein executing the instructions further causes the computing device to:
identify, based at least in part on a domain-specific ontology, one or more entities of at least one of the user query or the answer candidate text;

for each of the one or more entities, identify, from the domain-specific ontology, one or more attributes of each entity; and validate the answer based on the one or more entities or one or more attributes identified for the user query or the answer candidate text.

20. The non-transitory computer readable medium of claim 19, wherein validating the answer further causes the computing device to:

calculate a syntactic generalization score between a first set of entities identified in the answer and a second set of entities identified in the user query; and determine that the answer is valid based at least in part on identifying the syntactic generalization score exceeds a predefined threshold value.

\* \* \* \* \*

UNITED STATES PATENT AND TRADEMARK OFFICE
CERTIFICATE OF CORRECTION

PATENT NO. : 12,182,518 B2
APPLICATION NO. : 17/505462
DATED : December 31, 2024
INVENTOR(S) : Galitsky Page 1 of 1

It is certified that error appears in the above-identified patent and that said Letters Patent is hereby corrected as shown below:

In the Specification

In Column 11, Line 38, delete "JeffBesos" and insert -- Jeff Besos --, therefor.

In Column 11, Lines 53-54, delete "(Lattutude1, Longtitude1)^" and insert -- (Latitude1, Longitude1)^ --, therefor.

In Column 11, Line 55, delete "Longtitude2)]," and insert -- Longitude2)], --, therefor.

In Column 11, Lines 55-56, delete "Longtitude^" and insert -- Longitude^ --, therefor.

In Column 14, Lines 40-41, delete "$c_t^{(p)}: s_t^{(j)}) = LN(s_t^{(j-1)} + T^{(j)}(s_t^{(j-1)}))$" and insert -- $c_t^{(p)}: s_t^{(j)} = LN(s_t^{(j-1)} + T^{(j)}(s_t^{(j-)}))$ --, therefor.

In Column 16, Line 15, delete "$W_i' = A_i' V_i' W_i'$" and insert -- $W_i' = A_i' V_i'. W_i'$ --, therefor.

In Column 20, Line 5, delete "Web-based" and insert -- web-based --, therefor.

Signed and Sealed this
Eighth Day of April, 2025

Coke Morgan Stewart
*Acting Director of the United States Patent and Trademark Office*